(12) United States Patent
Inoue et al.

(10) Patent No.: US 10,381,890 B2
(45) Date of Patent: Aug. 13, 2019

(54) AXIAL-GAP ROTATING ELECTRIC MACHINE

(71) Applicant: Kobe Steel, Ltd., Hyogo (JP)

(72) Inventors: Koji Inoue, Kobe (JP); Takashi Hiekata, Kobe (JP); Hiroaki Kawai, Kobe (JP); Shintaro Sasai, Akashi (JP); Tetsuya Ogawa, Akashi (JP); Toshiro Yamashita, Akashi (JP); Shingo Kasai, Hyogo (JP); Shumpei Hayashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 100 days.

(21) Appl. No.: 15/742,075

(22) PCT Filed: Jul. 20, 2016

(86) PCT No.: PCT/JP2016/071212
§ 371 (c)(1),
(2) Date: Jan. 5, 2018

(87) PCT Pub. No.: WO2017/029926
PCT Pub. Date: Feb. 23, 2017

(65) Prior Publication Data
US 2018/0198335 A1    Jul. 12, 2018

(30) Foreign Application Priority Data

Aug. 18, 2015 (JP) ................................. 2015-161005
Apr. 5, 2016 (JP) ................................. 2016-075829

(51) Int. Cl.
*H02K 16/00* (2006.01)
*H02K 1/30* (2006.01)
(Continued)

(52) U.S. Cl.
CPC ............. *H02K 1/30* (2013.01); *H02K 1/2793* (2013.01); *H02K 16/02* (2013.01); *H02K 2201/03* (2013.01)

(58) Field of Classification Search
CPC ........................................... H02K 1/28; H02K 1/30; H02K 1/278; H02K 1/2786; H02K 16/02; H02K 2201/03; H02K 21/24
(Continued)

(56) References Cited

U.S. PATENT DOCUMENTS 7,960,884 B2 * 6/2011 Miyata ................. H02K 1/2793
310/114
8,424,189 B2 * 4/2013 Doi ..................... H02K 1/2793
29/598
(Continued)

FOREIGN PATENT DOCUMENTS

JP    2006-014399 A    1/2006
JP    2010-115017 A    5/2010

OTHER PUBLICATIONS

International Search Report issued in PCT/JP2016/071212; dated Oct. 18, 2016.

*Primary Examiner* — Thanh Lam
(74) *Attorney, Agent, or Firm* — Studebaker & Brackett PC

(57) ABSTRACT

An axial gap type dynamo-electric machine (1) comprises: a stator (2) provided with a magnetic core (21) and an exciting coil (22); a rotor (3) provided with a plurality of permanent magnets (4) circumferentially arranged around a rotation center axis (AX), the rotor (3) being also provided with a disk-shaped base material (31) for supporting the permanent magnets, the rotor (3) being disposed at an axial distance from the stator (2); and affixation members (5) for affixing the permanent magnets (4) to the base material (31). The permanent magnets (4) are provided with front surfaces
(Continued)

facing the stator (2), rear surfaces facing the base material, and engagement-receiving sections (412, 422, 432) formed at peripheral edges of the permanent magnets (4). The affixation members (5) include: engagement sections (512) engaging the engagement-receiving sections; and affixation sections (511) forming mechanical affixation structures relative to the base material.

19 Claims, 21 Drawing Sheets

(51) Int. Cl.
  *H02K 1/27* (2006.01)
  *H02K 16/02* (2006.01)
(58) Field of Classification Search
  USPC .............. 310/112, 114, 268, 156.18, 156.22, 310/156.32, 156.36, 156.37
  See application file for complete search history.

(56) References Cited

U.S. PATENT DOCUMENTS

| | | | |
|---|---|---|---|
| 8,937,422 B2* | 1/2015 | Enomoto | H01F 3/04 |
| | | | 310/156.32 |
| 2011/0241460 A1* | 10/2011 | Mebarki | H02K 1/20 |
| | | | 310/64 |
| 2012/0133231 A1* | 5/2012 | Hayakawa | H02K 16/00 |
| | | | 310/156.37 |
| 2014/0152136 A1 | 6/2014 | Duford et al. | |
| 2017/0366050 A1* | 12/2017 | Hattori | H02K 1/02 |

* cited by examiner

AXIAL-GAP ROTATING ELECTRIC MACHINE

TECHNICAL FIELD

The present invention relates to a rotating electric machine, such as a motor or a generator, and, in particular, to an axial-gap rotating electric machine in which a stator including an excitation coil and a rotor including a permanent magnet are disposed with a gap therebetween in an axial direction.

BACKGROUND ART

Axial-gap rotating electric machines have advantages in that the thickness thereof can be reduced and a large torque can be obtained, compared with radial-gap rotating electric machines in which a stator is disposed on the outer peripheral side of a rotor. Therefore, application of axial-gap rotating electric machines to electric automobiles and the like is anticipated. An axial-tap rotating electric machine has a structure in which a stator including an excitation coil and a rotor including a permanent magnet are disposed with a very small gap (axial gap) therebetween in the axial direction. The rotor includes a disk-shaped substrate, which functions as a back yoke, and a plurality of permanent magnets disposed and fixed on a surface of the disk-shaped substrate. Typically, each of the permanent magnets has a sectoral shape, and north poles and south poles for a desired pole number are alternately arranged annularly.

The permanent magnet is exposed to a magnetic field that changes with time when the rotor rotates. Therefore, Joule heat is generated in the permanent magnet due to an eddy current, and thereby a problem occurs in that the permanent magnet is heated and the magnetic force of the permanent magnet decreases. In order to reduce the Joule heat, it is effective to reduce the magnitude of the eddy current by dividing the permanent magnet into pieces as described, for example, in PTL 1.

How to fix a plurality of permanent magnets to the disk-shaped substrate of the rotor is a common problem for axial-gap rotating electric machines. That is, because the rotor faces the stator with a very small axial gap therebetween, a method that can be used to fix the permanent magnets is limited. In particular, in the case where the permanent magnet is divided into pieces in order to reduce the eddy current, it is difficult to securely fix the magnetic pieces.

In PTL 1, a method of fixing magnetic pieces to each other by using an adhesive is disclosed. The fixing method using an adhesive is advantageous in that a mechanical fixing member is not used and is also advantageous for joining the substrate and the permanent magnets, which differ from each other in coefficient of linear expansion. However, even when the permanent magnet is divided into pieces, an eddy current is generated in the permanent magnet and generates heat. As the temperature of the permanent magnet increases, generally, the adhesive becomes degraded, and a problem may occur in that the permanent magnet fixed by the adhesive is removed from the substrate.

CITATION LIST

Patent Literature

PTL 1: Japanese Unexamined Patent Application Publication No. 2006-14399 (FIG. 13)

SUMMARY OF INVENTION

Technical Problem

An object of the present invention is to provide an axial-gap rotating electric machine having a structure that enables a permanent magnet to be securely attached to a disk-shaped substrate of a rotor.

According to an aspect of the present invention, an axial-gap rotating electric machine includes a stator including a magnetic core and an excitation coil; a rotor including a plurality of permanent magnets that are arranged in a circumferential direction around a rotation axis and a disk-shaped substrate that supports the permanent magnets, the rotor being disposed with a gap between the rotor and the stator in an axial direction; and a fixing member that fixes each of the permanent magnets to the substrate. Each of the permanent magnets includes a front surface facing the stator and a rear surface facing the substrate and includes an engaged portion in a peripheral portion thereof. The fixing member includes an engaging portion that engages with the engaged portion and a fixing portion that forms a mechanical fixing structure to the substrate.

The object, features, and advantages of the present invention will become more apparent from the following detailed description and attached drawings.

DESCRIPTION OF EMBODIMENTS

Figure 1:
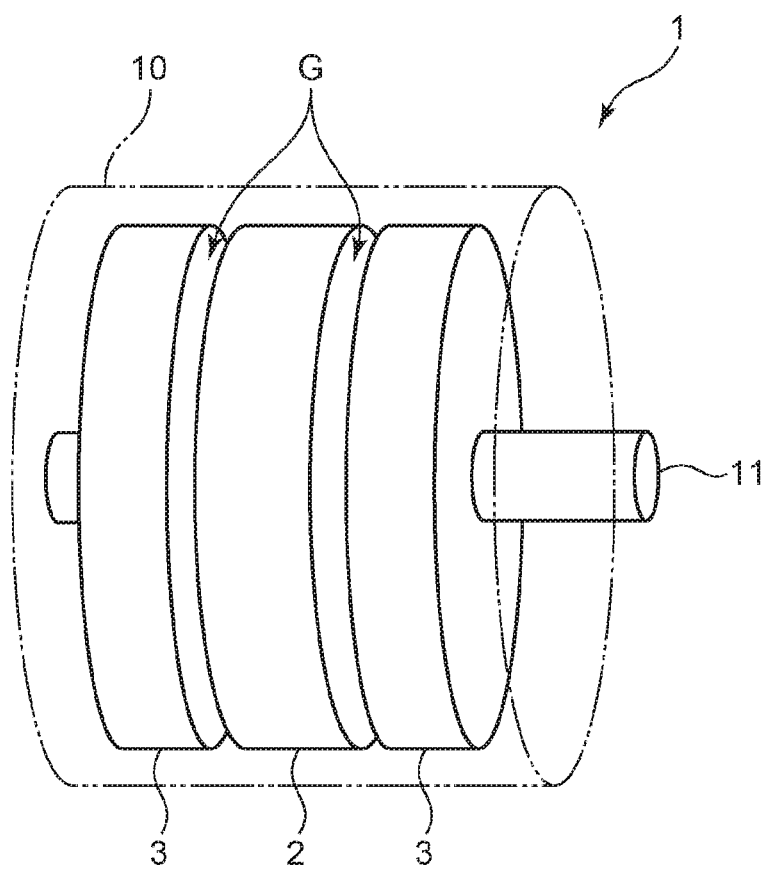
FIG. 1 is a schematic view illustrating the structure of an axial-gap rotating electric machine according to an embodiment of the present invention.

Hereinafter, embodiments of the present invention will be described in detail with reference to the drawings. FIG. 1 is a schematic view illustrating the structure of an axial-gap rotating electric machine 1 according to an embodiment of the present invention. In the present invention, the axial-gap rotating electric machine 1 may be, for example, a motor, a generator, or a motor generator. In the present embodiment, an axial-gap brushless DC motor is described as a preferred example of an axial-gap rotating electric machine.

Overall Structure of Axial-Gap Rotating Electric Machine

The axial-gap rotating electric machine 1 includes a casing 10 and a rotation shaft 11 that partially protrudes from the casing 10. The rotation shaft 11 functions as an output rotation shaft that generates a torque when the rotating electric machine 1 is used as a motor and functions as an input rotation shaft to which a rotational driving force is input when the rotating electric machine 1 is used as a generator.

The rotating electric machine 1 includes a disk-shaped stator 2 and two disk-shaped rotors 3, which are disposed in the casing 10. The stator 2 and the rotors 3 are disposed so as to be arranged in the axial direction of the rotation shaft 11. In the present embodiment, a double-rotor rotating electric machine 1, in which one of the rotors 3 faces one disk-shaped surface of the stator 2 and the other rotor 3 faces the other disk-shaped surface of the stator 2 and thereby the stator 2 is interposed between the two rotors 3, is described as an example. Needless to say, the rotating electric machine 1 may be a single-rotor rotating electric machine in which one rotor 3 and one stator 2 face each other in the axial direction.

Each of the rotors 3 is disposed with a gap G between the rotor 3 and the stator 2 in the axial direction. The length of the gap G, which is a so-called axial gap, is in the range of about 1 mm to several mm. The rotation shaft 11 is fixed to the disk-shaped rotor 3 so as to be aligned with the rotation axis of the rotor 3. The two rotors 3 are coupled to each other via a coupling shaft (not shown) that extends through a hollow portion of the stator 2 and that is disposed coaxially with the rotation shaft 11.

Figure 2:
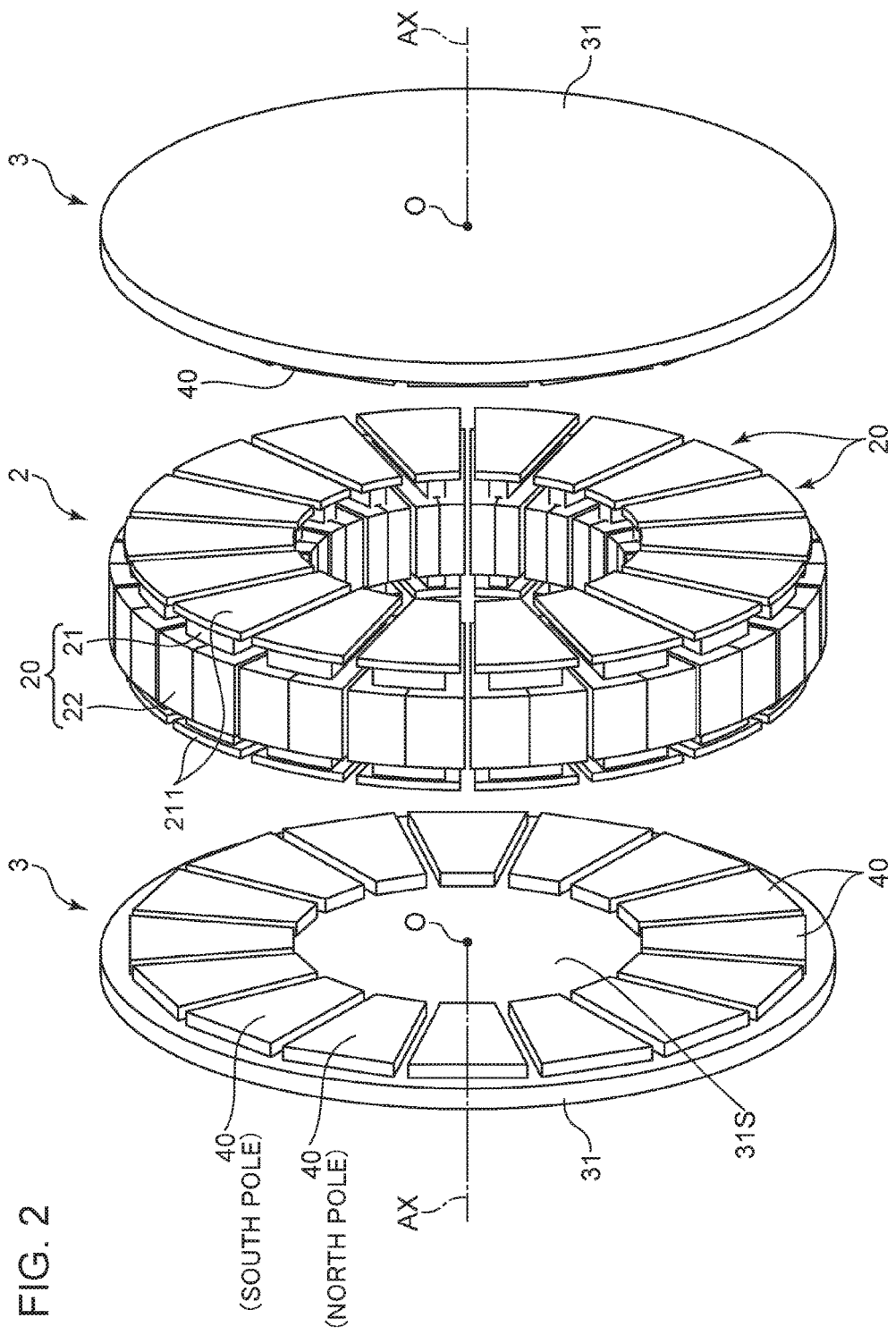
FIG. 2 is an exploded perspective view illustrating an example of the general structure of a stator and rotors of the rotating electric machine.

Here, an example of the general structure of a stator 2 and rotors 3 in an axial-gap rotating electric machine will be described. FIG. 2 is an exploded perspective view illustrating an example of the general structure of a stator 2 and rotors 3. In FIG. 2, the rotation axis AX of the rotors 3 (the axis of the rotation shaft 11) is shown. The stator 2 includes a plurality of electromagnetic units 20 that are arranged in the circumferential direction (the rotation direction of the rotors 3). Each of the electromagnetic units 20 includes a sectoral magnetic core 21 and an excitation coil 22 attached to the magnetic core 21. The plurality of magnetic cores 21 are supported by a core support member (not shown) and evenly arranged annularly around the rotation axis AX.

Preferably, the magnetic core 21 is a dust core. A dust core is formed by compacting iron powder coated with an electrically insulating film. In order to suppress an eddy current, besides the dust core, a stacked core that is a stack of a plurality of electromagnetic steel sheets may be used. The dust core is preferable for the magnetic core 21, because the dust core has a higher hermeticity and can be formed with a higher degree of freedom than the stacked core. In the present embodiment, the magnetic core 21 has a bobbin-like shape on both end surfaces of which flange portions 211 are formed.

The excitation coil 22 is formed by winding an insulated electric wire by a necessary number of turns around the bobbin-shaped magnetic core 21. By applying a direct electric current to the excitation coil 22, magnetic flux that extends through the magnetic core 21 in a direction parallel to the rotation shaft 11 is generated. By inverting the direction of flow of the direct electric current applied to the excitation coil 22, the direction of the magnetic flux can be inverted. A driver circuit (not shown) controls application of an electric current to each excitation coil 22 and inversion of the direction of the electric current, and thereby lines of magnetic force that rotate the rotor 3 around the rotation shaft 11 are formed.

The rotors 3 each include a plurality of permanent magnets 40 and a disk-shaped substrate 31 that supports the permanent magnets 40. Each of the permanent magnets 40 has a flat sectoral plate-like shape in axial view. The substrate 31 has a circular support surface 31S that faces the stator 2 and that is perpendicular to the rotation axis AX. The plurality of permanent magnets 40 are arranged annularly around the central point O of the support surface 31S (a point of intersection with the rotation axis AX) in a region near an outer periphery of the support surface 31S so that south poles and north poles are alternately arranged.

The disk-shaped substrate 31, which is made of a magnetic material such as steel, has both of a function of supporting the permanent magnets 40 and a function as a back yoke of the permanent magnets 40. When a permanent magnet 40 is magnetized so that the front surface thereof, which faces the stator 2, is the south pole, the rear surface of the permanent magnet 40 is the north pole. Another permanent magnet 40 adjacent to this permanent magnet 40 has the north pole at the front surface and the south pole at the rear surface. The substrate 31 serves to support the rear sides of the permanent magnets 40 and to form magnetic paths between the south poles and the north poles on the rear sides. With existing technologies, generally, the permanent magnet 40 is fixed to the support surface 31S of the substrate 31 by using, for example, an adhesive such as an epoxy resin adhesive. This is because an adhesive is suitable for joining two members that have different coefficients of linear expansion, such as the permanent magnet 40 made of neodymium or the like and the substrate 31 made of steel or the like.

The rotating electric machine 1 structured as described above has a problem of heat generated due to an eddy current in the permanent magnet 40. The permanent magnet 40 is exposed to a magnetic field that changes with time when the rotor 3 rotates. Thus, an eddy current is generated in the permanent magnet 40, and the permanent magnet 40 heats up due to Joule heat. As the temperature of the permanent magnet 40 increases, the magnetic force of the permanent magnet 40 decreases and an adhesive that bonds the permanent magnet 40 to the substrate 31 becomes degraded. Due to the degradation, a trouble in that the permanent magnet 40 is removed from the substrate 31 may occur.

Figure 3:
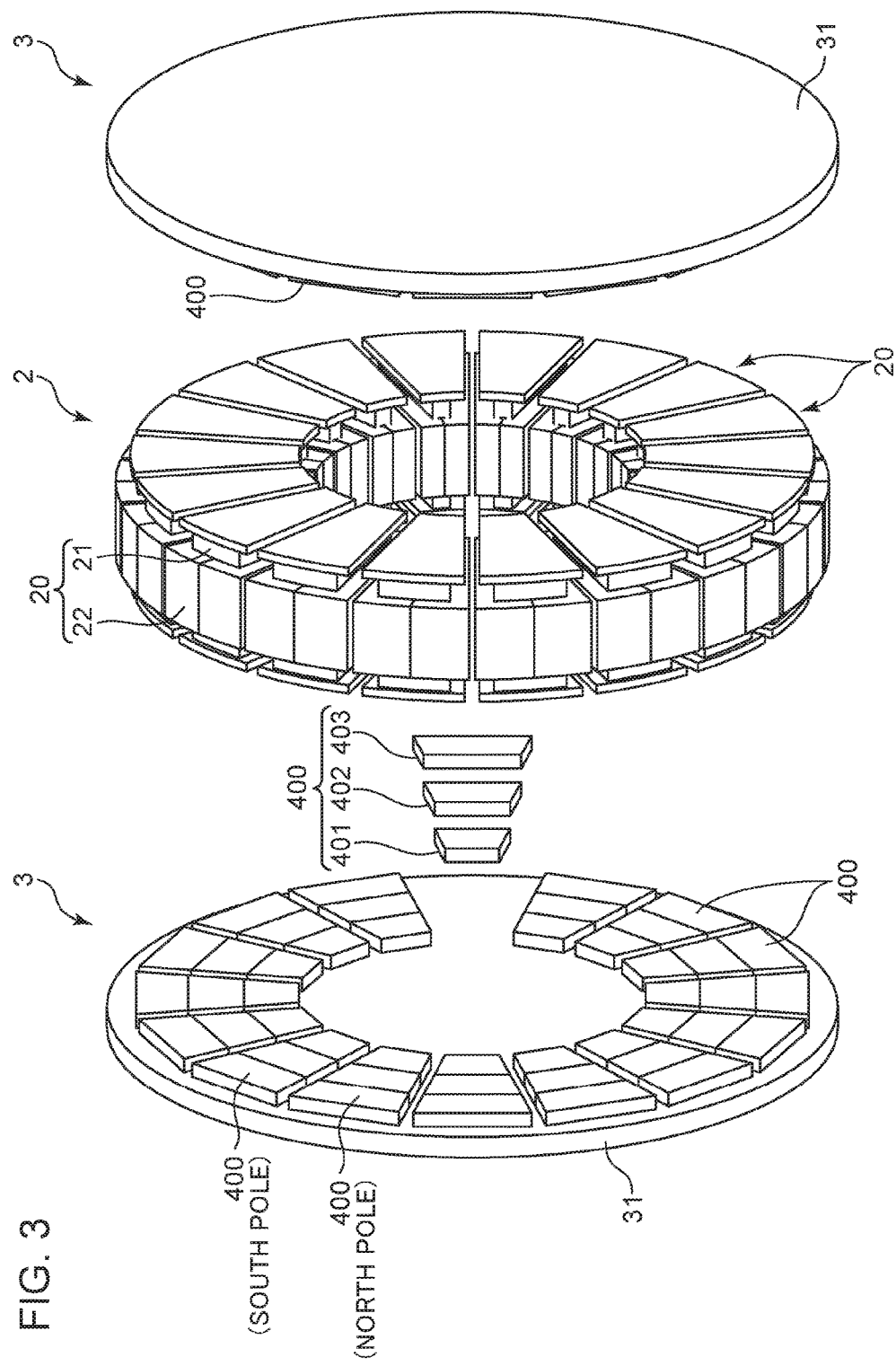
FIG. 3 is an exploded perspective view illustrating another example of the structure of a stator and rotors of the rotating electric machine.

FIG. 3 is an exploded perspective view illustrating another example of the structure of rotors 3. In each of the rotors 3 shown in FIG. 3, a permanent magnet forming one pole is a permanent magnet unit 400 that includes a plurality of magnetic pieces 401, 402, and 403. That is, the permanent magnet 40 shown in FIG. 2 is divided into three magnetic pieces 401, 402, and 403 in the radial direction of the disk-shaped substrate 31. These magnetic pieces 401, 402, and 403 are fixed to the substrate 31 by using an adhesive in a similar way.

By using the divided magnetic pieces 401, 402, and 403, the amount of generated eddy current can be reduced. However, even when the permanent magnet is divided into small volumes, an eddy current is inevitably generated in the magnetic pieces 401, 402, 403 and generates heat. Accordingly, the aforementioned phenomenon of degradation of adhesive occurs, and it is not possible to completely avoid the problem of removal of the permanent magnet unit 400 from the substrate 31. Hereinafter, embodiments that can solve the problem of removal of the permanent magnet of the rotor 3 will be described.

First Embodiment

Figure 4:
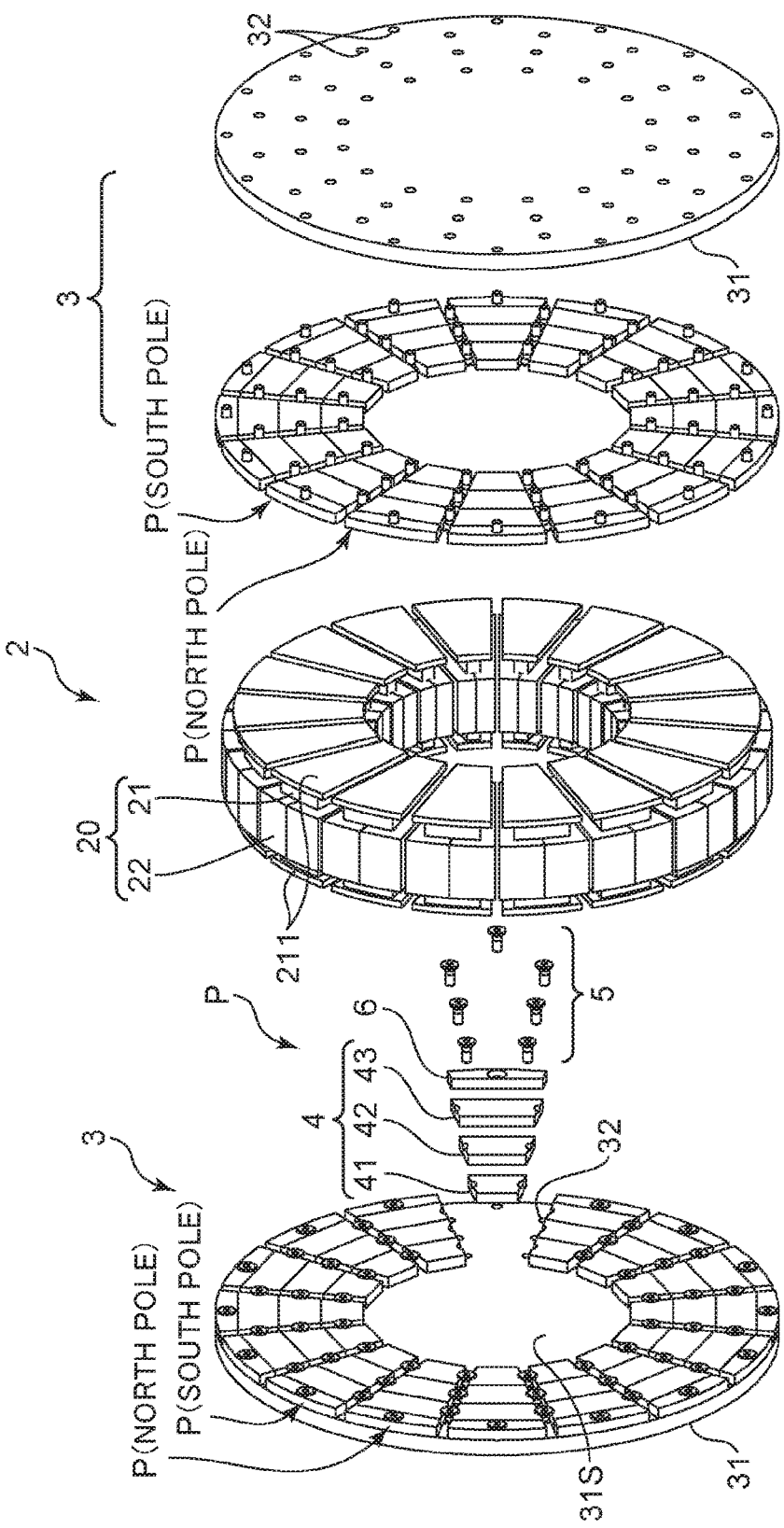
FIG. 4 is an exploded perspective view illustrating a stator and rotors according to a first embodiment of the present invention.

FIG. 4 is an exploded perspective view illustrating a stator 2 and rotors 3 of an axial-gap rotating electric machine according to a first embodiment of the present invention. The basic structure of a rotating electric machine described as an example in the first embodiment is a double-rotor rotating electric machine in which one stator 2 is interposed between two rotors 3, which is the same as those shown above in FIGS. 2 and 3. Description of the structure of the stator 2, which is the same as that described above, will be omitted here.

Each of the rotors 3 includes a disk-shaped substrate 31 and a plurality of magnetic pole units P each of which forms one magnetic pole. The disk-shaped substrate 31 includes a circular support surface 31S described above and a plurality of screw holes 32 extending through the substrate 31 in the axial direction. The substrate 31 supports the magnetic pole units P on the support surface 31S and functions as a back yoke of permanent magnets included in the magnetic pole units P. The plurality of magnetic pole units P are arranged around the rotation axis of the substrate 31 in the circumferential direction.

Figure 5:
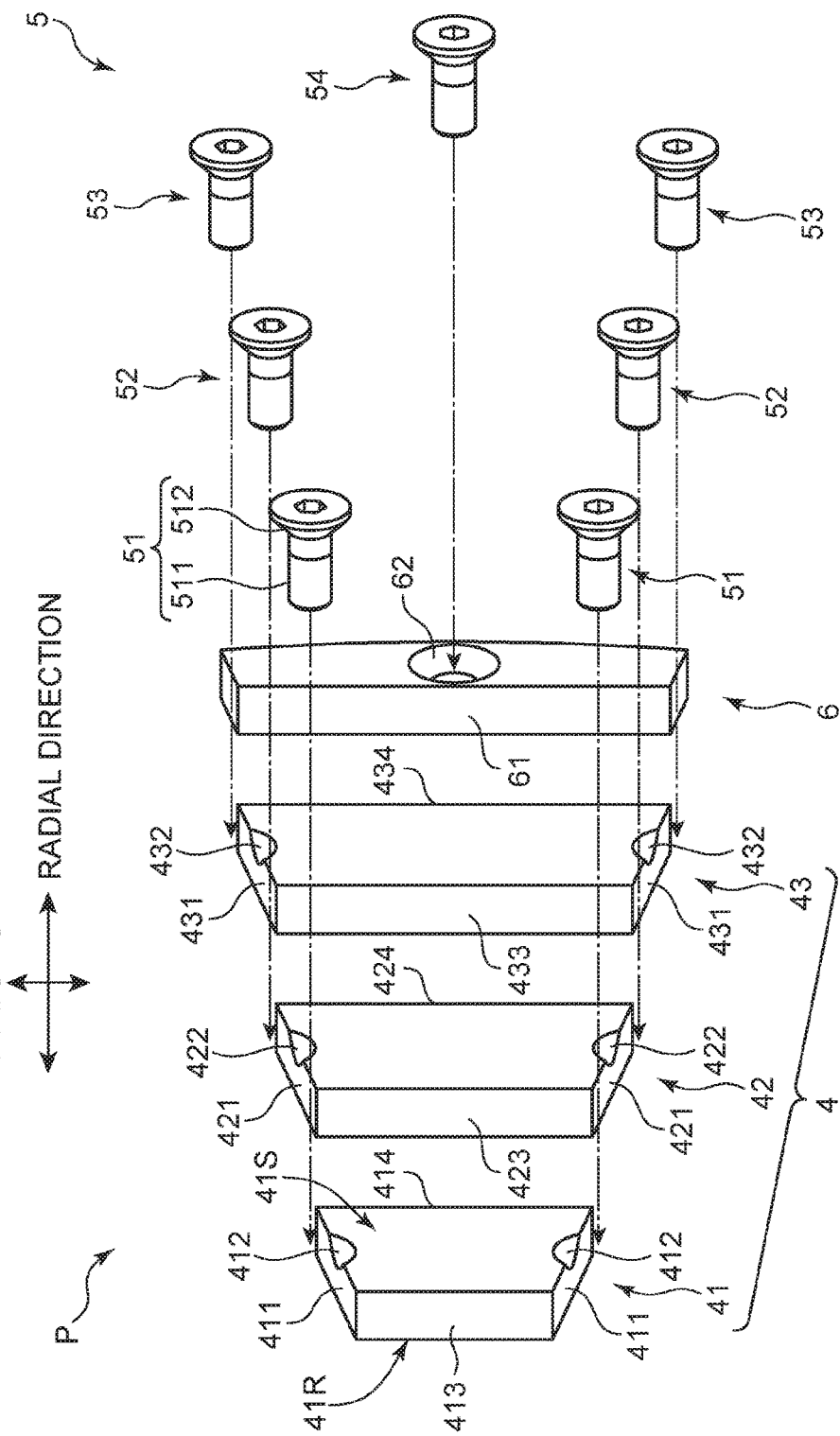
FIG. 5 is a perspective view illustrating magnetic pieces of the first embodiment.

FIG. 5 is an exploded perspective view illustrating the structure of one magnetic pole unit P. The magnetic pole unit P includes a permanent magnet 4, a fixing member 5 that fixes the permanent magnet 4 to the substrate 31, and a fixing piece 6 that holds an outer peripheral portion of the permanent magnet 4. The permanent magnet 4 is further divided into a plurality of magnetic pieces, which are a first magnetic piece 41, a second magnetic piece 42, and a third magnetic piece 43. As with the magnetic pieces shown in FIG. 3, these magnetic pieces 41 to 43 are pieces that are divided in the radial direction of the substrate 31. One sectoral permanent magnet 4 is formed by disposing the magnetic pieces 41 to 43 adjacent to each other.

Each of the first to third magnetic pieces 41 to 43 has a substantially trapezoidal shape in axial view. The first magnetic piece 41 is a piece that is located nearest to the center of an arc of the sectoral permanent magnet 4 and that has the smallest width in the circumferential direction. The third magnetic piece 43 is a piece that is located farthest from the center of the arc and that has the largest width in the circumferential direction. The second magnetic piece 42 is a piece that is located between these two pieces and that has a width between the widths of the two pieces.

The first magnetic piece 41 includes a front surface 41S facing the stator 2 and a rear surface 41R facing the substrate 31. The front surface 41S and the rear surface 41R are both flat trapezoidal surfaces. The front surface 41S is disposed parallel to a surface of the flange portion 211 of the magnetic core 21, which is also a flat trapezoidal surface, so as to face the surface of the flange portion 211 with a predetermined axial gap therebetween. The rear surface 41R is pressed against the support surface 31S of the substrate 31 directly or via an adhesive due to a tightening force of the fixing member 5. The second magnetic piece 42 and the third magnetic piece 43 each include a front surface and a rear surface similar to those described above.

The first magnetic piece 41 includes four side surfaces in a peripheral portion thereof. The four side surfaces include a pair of peripheral side surfaces 411, which are side surfaces in the circumferential direction of the first magnetic piece 41; an inner side surface 413 inside in the radial direction; and an outer side surface 414 that is longer than the inner side surface 413 in the circumferential direction. The peripheral side surfaces 411 connect the inner side surface 413 and the outer side surface 414, which have different lengths in the circumferential direction, to each other. The distance between the pair of peripheral side surfaces 411 increases outward in the radial direction. These side surfaces are substantially perpendicular to the support surface 31S.

Recesses 412 (engaged portions), each of which is semi-conical (semicircular in axial view), are formed in both end portions of the first magnetic piece 41 in the circumferential direction, that is, in the peripheral side surfaces 411. Each of the recesses 412 is recessed from the front surface 41S toward the rear surface 41R. In the front surface 41S, the recess 412 has a semicircular opening edge that is convex toward the center of the first magnetic piece 41 in the circumferential direction. In the peripheral side surface 411, the recess 412 has a semicircular opening edge that is convex toward the rear surface 41R. The recess 412 is a countersink in which a head portion of a countersunk-head screw (described below) is to be contained.

The second magnetic piece 42 and the third magnetic piece 43 each has a shape similar to that of the first magnetic piece 41 except that they differ in length in the circumferential direction. That is, the second magnetic piece 42 includes a pair of peripheral side surface 421, an inner side surface 423, and an outer side surface 424. Recesses 422 (engaged portions), each of which is semiconical, are formed in both end portions of the second magnetic piece 42 in the circumferential direction, that is, in the peripheral side surfaces 421. The third magnetic piece 43 includes a pair of peripheral side surface 431, an inner side surface 433, and an outer side surface 434. Recesses 432 (engaged portions), each of which is semiconical, are formed in both end portions of the third magnetic piece 43 in the circumferential direction, that is, in the peripheral side surfaces 431.

Examples of the permanent magnet 4 include a neodymium magnet, a samarium-cobalt magnet, a ferrite magnet, and an alnico magnet. These permanent magnets are manufactured by molding material powder into a final shape and then magnetizing the molded body by, for example, exposing the molded body in a strong magnetic field. Therefore, because the magnet can be molded before being magnetized, manufacturing of the divided magnetic pieces 41 to 43 and chamfering of the magnetic pieces 41 to 43 for forming the recesses 412, 422, and 432 can be performed flexibly and easily.

The fixing piece 6 (restricting portion) is a member for preventing extraction of the first to third magnetic pieces 41 to 43 in the radial direction due to a centrifugal force when the rotor 3 rotates. The fixing piece 6 includes a pressing surface 61, which faces the outer side surface 434 of the third magnetic piece 43 (an outer end portion of the permanent magnet in the radial direction) and has substantially the same length as the outer side surface 434 in the circumferential direction; and a fixing hole 62 for fixing the fixing piece 6 to the substrate 31. Only one fixing hole 62 is formed at the center of the fixing piece 6 in the circumferential direction.

When the first to third magnetic pieces 41 to 43 are fixed to the substrate 31, the outer side surface 414 of the first magnetic piece 41 and the inner side surface 423 of the second magnetic piece 42 closely contact each other, and the outer side surface 424 of the second magnetic piece 42 and the inner side surface 433 of the third magnetic piece 43 closely contact each other. Moreover, the outer side surface 434 of the third magnetic piece 43 and the pressing surface 61 of the fixing piece 6 closely each other, and the pressing surface 61 receives the centrifugal force of the permanent magnet 4.

In the present embodiment, the fixing member 5 includes a plurality of countersunk-head screws. In the present embodiment, the fixing member 5 includes a pair of first countersunk-head screws 51 that fix the first magnetic piece 41 to the substrate 31, a pair of second countersunk-head screws 52 that fix the second magnetic piece 42 to the substrate 31, a pair of third countersunk-head screws 53 that fix the third magnetic piece 43 to the substrate 31, and one fourth countersunk-head screw 54 that fixes the fixing piece 6 to the substrate 31.

Each of the first countersunk-head screws 51 includes a shank 511 (fixing portion) including an externally threaded portion, and a countersunk head 512 (engaging portion) that is continuous with one end of the shank 511 and increases in diameter in a tapered shape. The cross-sectional shape of the shank 511 perpendicular to the screw axis direction is a circle, and the cross-sectional shape of the countersunk head 512 is a circle having a larger diameter than the shank 511. The shank 511 is screwed into the screw hole 32 of the substrate 31 and thereby forms a mechanical fixing structure to the substrate 31. The countersunk head 512, which engages with the recess 412, has a hexagonal hole that allows a hexagonal wrench for tightening the screw to be fit thereinto. The first magnetic piece 41 is fixed to the substrate 31 by screwing the shank 511 into the screw hole 32 at a predetermined position in a state in which a part of the countersunk head 512 presses the recess 412. The countersunk head 512 has a size such that the countersunk head 512 is contained in the recess 412 and does not protrude from the front surface 41S when the screw has been tightened. That is, the countersunk head 512 is engaged with the recess 412 without protruding from the front surface 41S (see FIG. 7).

Other countersunk-head screws 52, 53, and 54 have the same structure as the first countersunk-head screw 51. The pair of second countersunk-head screws 52 are screwed into the substrate 31 so as to each engage with a corresponding one of the recesses 422, which are disposed at both end portions of the second magnetic piece 42 in the circumferential direction, and fix the second magnetic piece 42 to the substrate 31. The pair of third countersunk-head screws 53 are screwed into the substrate 31 so as to each engage with a corresponding one of the recesses 432, which are disposed at both end portions of the third magnetic piece 43 in the circumferential direction, and fix the third magnetic piece 43 to the substrate 31. The fourth countersunk-head screw 54 is screwed into the screw hole of the substrate 31 through the fixing hole 62 of the fixing piece 6, and fixes the fixing piece 6 to the substrate 31.

Figure 6:
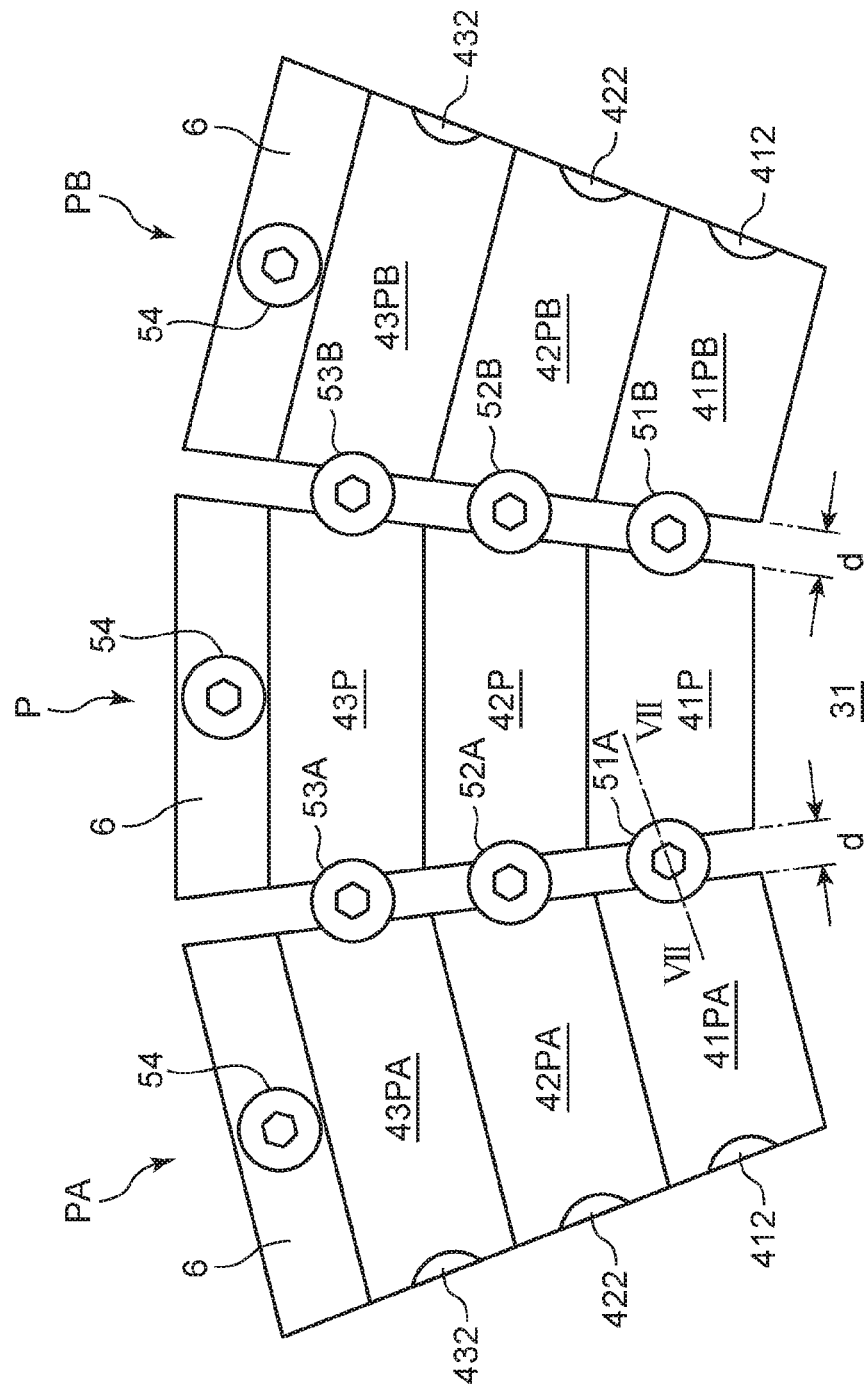
FIG. 6 is a plan view illustrating a state in which the magnetic pieces are attached to a rotor substrate.
Figure 7:
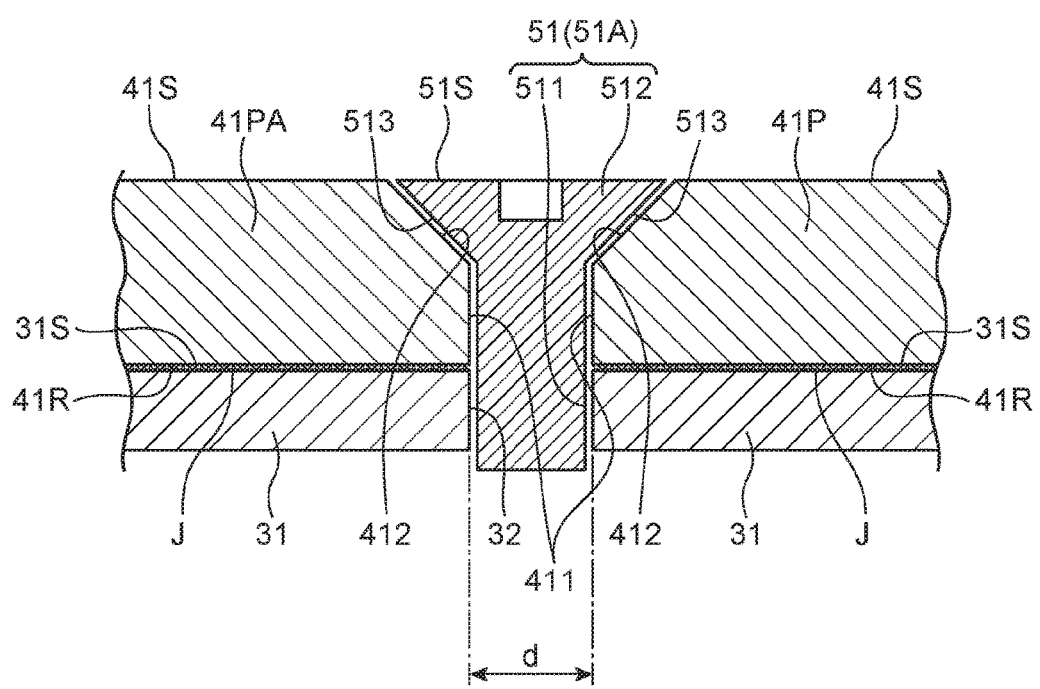
FIG. 7 is a sectional view taken along line VII-VII of FIG. 6.

In the present embodiment, each of the first to third countersunk-head screws 51 to 53 not only fixes one magnetic piece but also fixes another magnetic piece adjacent thereto. This point will be described with reference to FIGS. 6 and 7. FIG. 6 is a plan view illustrating a state in which the magnetic pieces 41 to 43 are attached to the substrate 31. FIG. 7 is a sectional view taken along line VII-VII of FIG. 6.

FIG. 6 selectively illustrates a magnetic pole unit P (one magnetic pole), an upstream magnetic pole unit PA (another magnetic pole) adjacent to the magnetic pole unit P in the counterclockwise direction (treated as "upstream"), and a downstream magnetic pole unit PB (another magnetic pole) adjacent to the magnetic pole unit P in the clockwise direction (treated as "downstream"). The first, second, and third magnetic pieces 41P, 42P, and 43P of the magnetic pole unit P are respectively arranged side-by-side with the first, second, and third magnetic pieces 41PA, 42PA, and 43PA of the upstream magnetic pole unit PA with a gap d therebetween in the circumferential direction; and arranged side-by-side with the first, second, and third magnetic pieces 41PB, 42PB, and 43PB of the downstream magnetic pole unit PB with a gap d therebetween in the circumferential direction. That is, the same-sized magnetic pieces of the magnetic pole units are arranged in the circumferential direction at the same positions in the radial direction with a gap d therebetween.

Thus, for example, as illustrated in FIG. 7, one substantially circular recess is formed by a semicircular recess 412 in an upstream part of the first magnetic piece 41P of the magnetic pole unit P and a semicircular recess 412 in a downstream part of the first magnetic piece 41PA of the upstream magnetic pole unit PA, with a gap d therebetween. The two adjacent first magnetic pieces 41P and 41PA are fixed in such a way that the countersunk head 512 of one first countersunk-head screw 51A is contained in the substantially circular recess. Substantially circular recesses as described above are also formed by the recesses 422 and 423 in upstream parts of the second and third magnetic pieces 42P and 43P of the magnetic pole unit P and the recesses 422 and 423 in downstream parts of the second and third magnetic pieces 42PA and 43PA of the magnetic pole unit PA. Two adjacent magnetic pieces are fixed in such a way that each of the second and third countersunk-head screws 52A and 53A is contained in a corresponding one of the substantially circular recesses.

Likewise, substantially circular recesses as described above are also formed by the recesses 412, 422, and 423 in downstream parts of the first, second, and third magnetic pieces 41P, 42P, and 43P of the magnetic pole unit P and the recesses 412, 422, and 423 in upstream parts of the first, second, and third magnetic pieces 41PB, 42PB, and 43PB of the magnetic pole unit PB. Two adjacent magnetic pieces are fixed in such a way that each of the first, second, and third countersunk-head screws 51B, 52B, and 53B is contained in a corresponding one of the substantially circular recesses.

Referring to FIG. 7, the fixing structure for fixing magnetic pieces in one of the substantially circular recesses will be described further in detail. The rear surfaces 41R of the first magnetic piece 41P of the magnetic pole unit P and the first magnetic piece 41PA of the upstream magnetic pole unit PA are joined to the support surface 31S of the substrate 31 via an adhesive J. Although the adhesive J may be omitted, preferably, layers of the adhesive J are interposed between the magnetic pieces 41P and 41PA and the support surface 31S so that the magnetic pieces 41P and 41PA can be more stably fixed to the support surface 31S.

One substantially conical recess is formed as the peripheral side surface 411 of the first magnetic piece 41P on the upstream side and the peripheral side surface 411 of the first magnetic piece 41PA on the downstream side face each other and the recesses 412 of the first magnetic pieces 41P and 41PA face each other. The shank 511 of the first countersunk-head screw 51 is tightened into the screw hole 32 of the substrate 31, and the countersunk head 512 is contained in the substantially conical recess. An upstream part of a conical tapered surface 513 of the countersunk head 512 presses the recess 412 of the first magnetic piece 41PA on the left side in FIG. 7, and a downstream part of the conical tapered surface 513 presses the recess 412 of the first magnetic piece 41P on the right side in FIG. 7.

A part of the shank 511 above a threaded part screwed into the screw hole 32 is disposed between the peripheral side surfaces 411 facing each other. That is, the diameter of the shank 511 is slightly smaller than the gap d (FIG. 6). The countersunk head 512 is completely contained in the substantially conical recess formed by the pair of recesses 412. A top surface 51S of the countersunk head 512 is substantially flush with the front surfaces 41S of the first magnetic pieces 41P and 41PA. The top surface 51S may be flush with the front surfaces 41S or the top surface 51S may be recessed from the front surfaces 41S and engaged with the recess 412 without protruding from the front surfaces 41S. In the present invention, preferably, as in the example shown in FIG. 7, the first countersunk-head screw 51, which is a fixing member, is engaged with the substrate 31 in such a way that the top surface 51S does not protrude from the front surface 41S. However, a part of the fixing member (here, the top surface 51S) may slightly protrude from the front surface 41S to a degree such that the axial gap (the gap G in FIG. 1) is not affected.

With the rotating electric machine according to the first embodiment described above, the engaging portions of the fixing member 5 (the countersunk heads 512 of the countersunk-head screws 51 to 53) engage with the recesses 412, 422, and 423 of the first to third magnetic pieces 41 to 43 and thereby restrain these magnetic pieces, while the countersunk heads 512 do not interfere with the stator 2 because the countersunk heads 512 do not protrude from the front surfaces 41S of the magnetic pieces 41 to 43. Accordingly, even when the axial gap is very small, the magnetic pieces 41 to 43 can be appropriately fixed to the disk-shaped substrate 31. Moreover, even when the temperature of the magnetic pieces 41 to 43 becomes high due to an eddy current, the magnetic pieces 41 to 43 are not removed from the substrate 31.

The recesses 412, 422, and 423, which are engaged portions, are disposed in a peripheral portion of the permanent magnet 4 (the magnetic pieces 41 to 43). Therefore, the recesses 412, 422, and 423 do not affect a magnetic circuit formed by the permanent magnet 4. It may be possible to fix the permanent magnet 4 to the substrate 31 by forming a screw hole near the center of the permanent magnet 4 in the circumferential direction and by tightening the screw into the screw hole. However, if a screw hole is formed near the center, the screw hole obstructs formation of a magnetic path and reduces the magnetic force of the magnetic pole unit P. However, in the present embodiment, because a chamfered portion, for fixing magnets, is disposed in a peripheral portion of the permanent magnet 4, formation of a magnetic path in the magnetic pole unit P is not affected.

Moreover, in the present embodiment, each of the countersunk-head screws 51 to 53 fixes the plurality of magnetic pieces 41 to 43. A countersunk-head screw may be used for each of two end portions of the magnetic pieces 41 to 43 of each magnetic pole unit P. In this case, however, the number of countersunk-head screws increases, and a space for disposing the countersunk-head screws is necessary. With the present embodiment, it is possible to reduce the number of countersunk-head screws used and to reduce the space for disposing the countersunk-head screws.

Modification of First Embodiment

Figure 8:
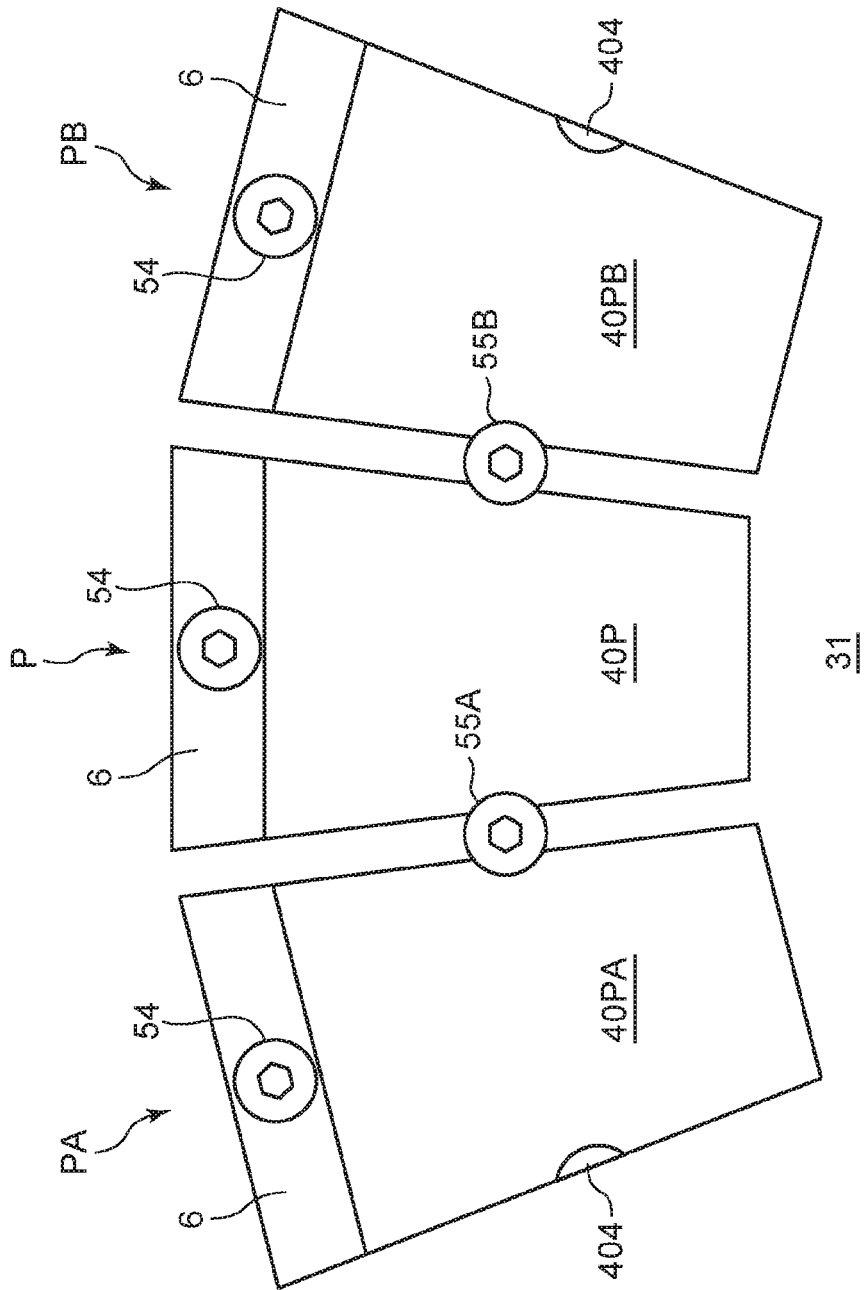
FIG. 8 is a plan view illustrating a modification of the first embodiment.

FIG. 8 is a plan view illustrating a state in which permanent magnets are attached to the substrate 31 according to a modification of the first embodiment. In the embodiment described above, the permanent magnet 4 of one magnetic pole unit P is divided into a plurality of magnetic pieces 41 to 43, and these are respectively fixed to the substrate 31 by using the countersunk-head screws 51 to 53. Instead, in the modification illustrated in FIG. 8, the permanent magnet of one magnetic pole unit P is fixed to the substrate 31 without dividing the permanent magnet.

FIG. 8 selectively illustrates a magnetic pole unit P, an upstream magnetic pole unit PA, and a downstream magnetic pole unit PB. The magnetic pole units P, PA, and PB respectively include permanent magnets 40P, 40PA, and 40PB, each of which is one sectoral permanent magnet. Each of the permanent magnets 40P, 40PA, and 40PB includes semiconical recesses 404, each of which is an engaged portion, at both end portions thereof in the circumferential direction. One substantially conical recess is formed by the recesses 404 of the permanent magnet 40P and the upstream permanent magnet 40PA, which are adjacent to each other. Likewise, one substantially conical recess is formed by the recesses 404 of the permanent magnet 40P and the downstream permanent magnet 40PB, which are adjacent to each other. The permanent magnets 40P, 40PA, and 40PB are fixed to the substrate 31 in such a way that one first countersunk-head screw 55A and one first countersunk-head screw 55B are contained in these recesses. If it is possible to overcome the problem of increase of the temperatures of the permanent magnets 40P, 40PA, and 40PB due to an eddy current by using appropriate cooling means, the structure according to the present modification is preferable because the number of components can be further reduced.

In addition, in the embodiment described above, a countersunk-head screw is described as an example of the fixing member 5. However, this is not a limitation. Various screw members and various fixing elements can be used as the fixing member 5. For example, a spot-face screw can be used. When using a spot-face screw, the shapes of engaged portions formed at both end portions of the permanent magnet are semicylindrical. Alternatively, a rivet may be used as the fixing member 5. In this case, a fixing portion that forms a mechanical fixing structure with the substrate 31 is an upset portion of the rivet. Moreover, in the embodiment described above, the magnetic pieces 41 to 43, which are divided into three in the radial direction of the substrate 31, are described as an example. However, the diving number may be any appropriate number, such as two or four.

Second Embodiment

Figure 9:
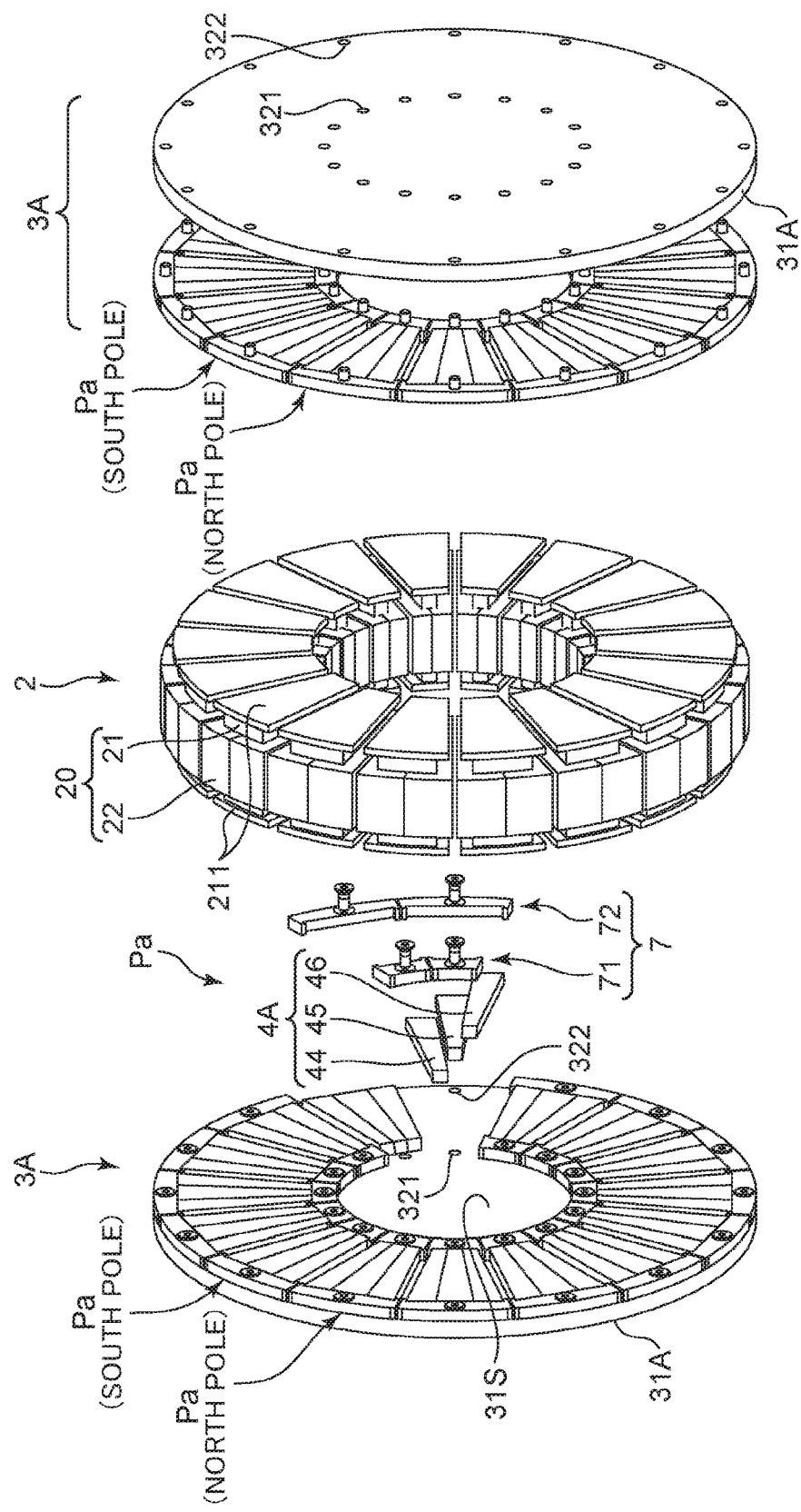
FIG. 9 is an exploded perspective view illustrating a stator and rotors according to a second embodiment of the present invention.

FIG. 9 is an exploded perspective view illustrating a stator 2 and rotors 3A of an axial-gap rotating electric machine according to a second embodiment of the present invention. The basic structure of a rotation electric machine described as an example in the second embodiment is also a double-rotor rotating electric machine in which one stator 2 is interposed between two rotors 3A, which is the same as those shown above in FIGS. 2 and 3. Description of the structure of the stator 2, which is the same as that described above, will be omitted here. Each of the rotors 3A differs from that of the first embodiment in that magnetic pieces formed by dividing a permanent magnet in the circumferential direction are used and in the structures of an engaged portion and a fixing member of a magnetic piece.

Each of the rotors 3A includes a disk-shaped substrate 31A and a plurality of magnetic pole units Pa each of which forms one magnetic pole. The substrate 31A includes a circular support surface 31S and a plurality of screw holes extending through the substrate 31A in the axial direction. The plurality of screw holes include a plurality of inner screw holes 321, which are annularly arranged near the middle of the substrate 31A in the radial direction, and outer screw holes 322, which are annularly arranged near the periphery of the substrate 31A. The substrate 31A supports the magnetic pole units Pa on the support surface 31S and functions as a back yoke of permanent magnets included in the magnetic pole units Pa. The plurality of magnetic pole units Pa are arranged around the rotation axis of the substrate 31A in the circumferential direction.

Figure 10:
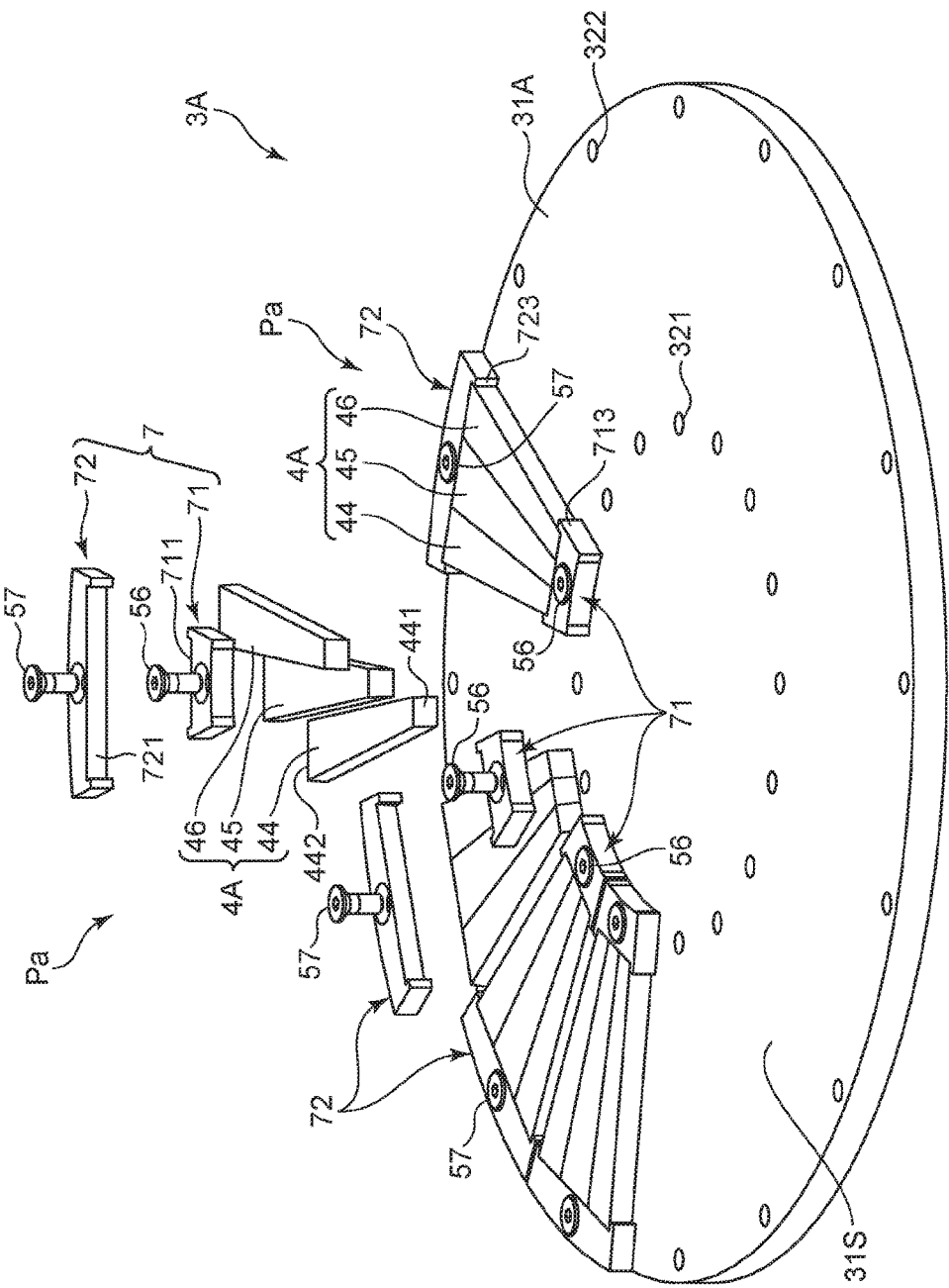
FIG. 10 is an exploded perspective view illustrating a state in which magnetic pieces are attached to a rotor substrate in the second embodiment.

FIG. 10 is an exploded perspective view of the rotor 3A, illustrating the structure of the magnetic pole units Pa according to the second embodiment. Here, a state in which some of the magnetic pole units Pa are attached to the substrate 31A and one of the magnetic pole units Pa is disassembled. Each of the magnetic pole units Pa includes a permanent magnet 4A and a fixing block 7 that fixes the permanent magnet 4A to the substrate 31A.

The permanent magnet 4A of one magnetic pole unit Pa is further divided into a plurality of magnetic pieces, which are a first magnetic piece 44, a second magnetic piece 45, and a third magnetic piece 46. Unlike the magnetic pieces shown in FIGS. 3 and 4, these magnetic pieces 44 to 46 are evenly divided in the circumferential direction of the disk-shaped substrate 31A. One sectoral permanent magnet 4A is formed by arranging the magnetic pieces 44 to 46 adjacent to each other. Each of the first to third magnetic pieces 44 to 46 has a substantially trapezoidal shape that is elongated in the radial direction in axial view. Each of the first to third magnetic pieces 44 to 46 is disposed on the substrate 31A so that a short base of the trapezoidal shape faces inward in the radial reaction and a long base of the trapezoidal shape faces outward in the radial direction.

Figure 11:
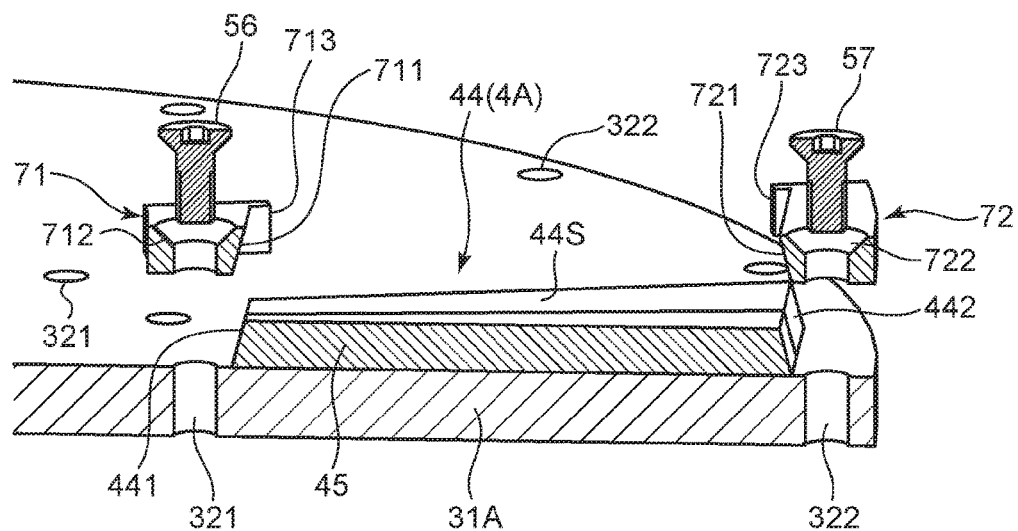
FIG. 11 is a partially sectional perspective view illustrating a state in which the magnetic pieces are attached to the rotor substrate.
Figure 12:
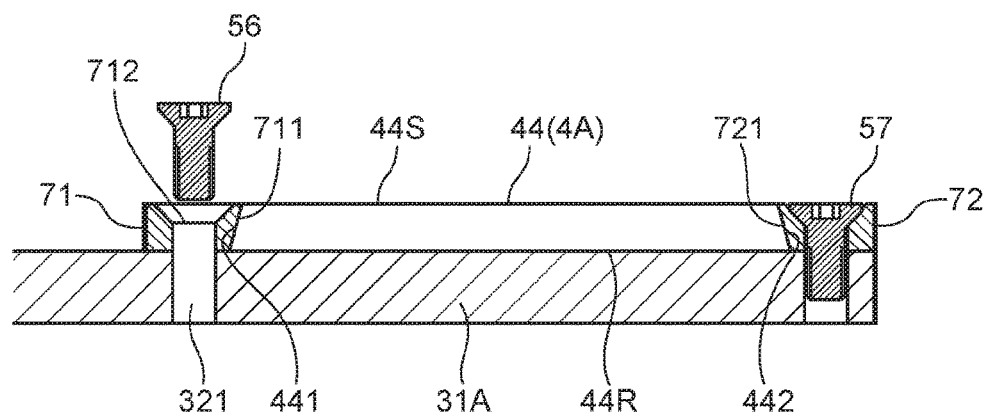
FIG. 12 is a sectional view illustrating a state in which the magnetic pieces are attached to the rotor substrate.

FIG. 11 is a partially sectional perspective view illustrating a state in which the first magnetic piece 44 is attached to the substrate 31A. FIG. 12 is a sectional view of FIG. 11. The first magnetic piece 44 includes an inner inclined surface 441 (engaged portion) at an inner end portion thereof in the radial direction and an outer inclined surface 442 (engaged portion) at an outer end portion thereof in the radial direction. These inclined surfaces 441 and 442 are formed at peripheries of the first magnetic piece 44 by making the width of the first magnetic piece 44 on a rear surface 44R side in the radial direction larger than the width of the first magnetic piece 44 on a front surface 44S side in the radial direction. That is, the inner inclined surface 441 is a surface that descends from an inner peripheral edge of the front surface 44S in the radial direction to the rear surface 44R toward the center of the substrate 31A, and the outer inclined surface 442 is a surface that descends from an outer peripheral edge of the front surface 44S in the radial direction to the rear surface 44R toward the outer periphery the substrate 31A.

The second magnetic piece 45 and the third magnetic piece 46 each have the same shape as the first magnetic piece 44. The first to third magnetic pieces 44 to 46 are disposed so that, when attached to the substrate 31A, one integrated inner inclined surface is formed by connecting the inner inclined surface 441 of the first magnetic piece 44 and the inner inclined surfaces of the second and third magnetic pieces 45 and 46. Likewise, the first to third magnetic pieces 44 to 46 disposed so that one integrated inclined surface is formed by connecting the outer inclined surface 442 of the first magnetic piece 44 and outer inclined surfaces of the second and third magnetic pieces 45 and 46.

The fixing block 7 includes a first fixing block 71 (fixing jig) that engages with an inner peripheral side of the permanent magnet 4A and a second fixing block 72 (fixing jig) that engages with an outer peripheral side of the permanent magnet 4A. The first fixing block 71 is fixed to the substrate 31A by screwing a first fixing screw 56 (fastener) into the inner screw hole 321. The second fixing block 72 is fixed to the substrate 31A by screwing a second fixing screw 57 (fastener) into the outer screw hole 322. In the present embodiment, the first and second fixing blocks 71 and 72 (engaging portions) and the first and second fixing screws 56 and 57 (fixing portions) constitute a fixing member in the present invention.

The first fixing block 71 and the second fixing block 72 are substantially trapezoidal flat blocks that have substantially the same thickness as the first to third magnetic pieces 44 to 46 in the axial direction. The first fixing block 71 includes a reversely inclined surface 711, a fixing hole 712, and a pair of grasping portions 713. The reversely inclined surface 711 is disposed on an outer side of the first fixing block 71. The reversely inclined surface 711 surface-contacts the integrated inner inclined surface (that is, the inner inclined surface of the permanent magnet 4A), which is formed by closely arranging the first to third magnetic pieces 44 to 46, and presses the inner inclined surface. The width of the reversely inclined surface 711 in the circumferential direction is substantially the same as the width of the integrated inner inclined surface in the circumferential direction. That is, the first fixing block 71 is disposed so as to extend across the first to third magnetic pieces 44 to 46.

The fixing hole 712 is a hole into which the first fixing screw 56 is inserted. The first fixing screw 56 is a countersunk-head screw, and the fixing hole 712 is a screw hole that is shaped so as to be engageable with the countersunk head of the first fixing screw 56. The pair of grasping portions 713 protrude outward the radial direction from both ends of the reversely inclined surface 711 in the circumferential direction. As illustrated in FIG. 10, the grasping portions 713 restrain both side surfaces of the first to third magnetic pieces 44 to 46 near the inner inclined surfaces in such a way that the grasping portions 713 grasp the side surfaces. Due to the restraint, disarrangement of the first to third magnetic pieces 44 to 46 is prevented.

Likewise, the second fixing block 72 includes a reversely inclined surface 721, a fixing hole 722, and a pair of grasping portions 723. The reversely inclined surface 721 is disposed on an inner side of the second fixing block 72. The reversely inclined surface 721 surface-contacts the integrated outer inclined surface of the first to third magnetic pieces 44 to 46 and presses the outer inclined surface. The width of the reversely inclined surface 721 in the circumferential direction is substantially the same as the width of the integrated outer inclined surface in the circumferential direction. The fixing hole 722 is a screw hole into which the second fixing screw 57, which is a countersunk-head screw, is inserted and that is shaped so as to be engageable with the countersunk head of the second fixing screw 57. The pair of grasping portions 723 protrude inward the radial direction from both ends of the reversely inclined surface 721 in the circumferential direction. The grasping portions 723 restrain both side surfaces of the first to third magnetic pieces 44 to 46 in the circumferential direction near the outer inclined surfaces. That is, the second fixing block 72 is also disposed so as to extend across the first to third magnetic pieces 44 to 46.

The first magnetic piece 44 is fixed to the substrate 31A because the inner inclined surface 441 and the outer inclined surface 442, which are disposed at both end portions thereof in the radial direction, are respectively pressed (restrained) by the reversely inclined surfaces 712 and 721. The same applies to the second and third magnetic pieces 45 and 46. To be specific, the first fixing screw 56 is screwed into the inner screw hole 321 in a state in which the fixing hole 712 of the first fixing block 71 is aligned with the inner screw hole 321 and the reversely inclined surface 711 is in contact with the integrated inner inclined surface of the first to third magnetic pieces 44 to 46. The second fixing screw 57 is screwed into the outer screw hole 322 in a state in which the fixing hole 722 of the second fixing block 72 is aligned with the outer screw holes 322 and the reversely inclined surface 721 is in contact with the integrated outer inclined surface of the first to third magnetic pieces 44 to 46. In the present embodiment, screwing of the first and second fixing screws 56 and 57 is forming of a mechanical fixing structure to the substrate 31A.

When the first and second fixing screws 56 and 57 are tightened, the reversely inclined surfaces 711 and 721 respectively press the integrated inner inclined surface and the integrated outer inclined surface. Therefore, the first to third magnetic pieces 44 to 46 are firmly fixed to the substrate 31A. As illustrated in FIG. 12, after the first and second fixing screws 56 and 57 have been tightened, the top surfaces of the countersunk heads thereof are flush with the front surface 44S of the first magnetic piece 44. As described above, the first and second fixing blocks 71 and 72 have substantially the same thickness as the first to third magnetic pieces 44 to 46. Accordingly, even when the axial gap is very small, a member for fixing the permanent magnet 4A does not interfere with the stator 2.

The inner inclined surface 441 and the outer inclined surface 442, which are engaged portions, are disposed at both end portions of the first magnetic piece 44 in the radial direction, that is, in peripheral portions of the first magnetic piece 44. Therefore, the inner inclined surface 441 and the outer inclined surface 442 do not affect a magnetic circuit formed by the permanent magnet 4A. Moreover, because the magnetic pieces 44 to 46, which are divided into three, are fixed by using one first fixing block 71 at the radially inner side and by using one second fixing block 72 at the radially outer side, an advantage is obtained in that the number of components can be reduced.

Modification of Second Embodiment

Figure 13:
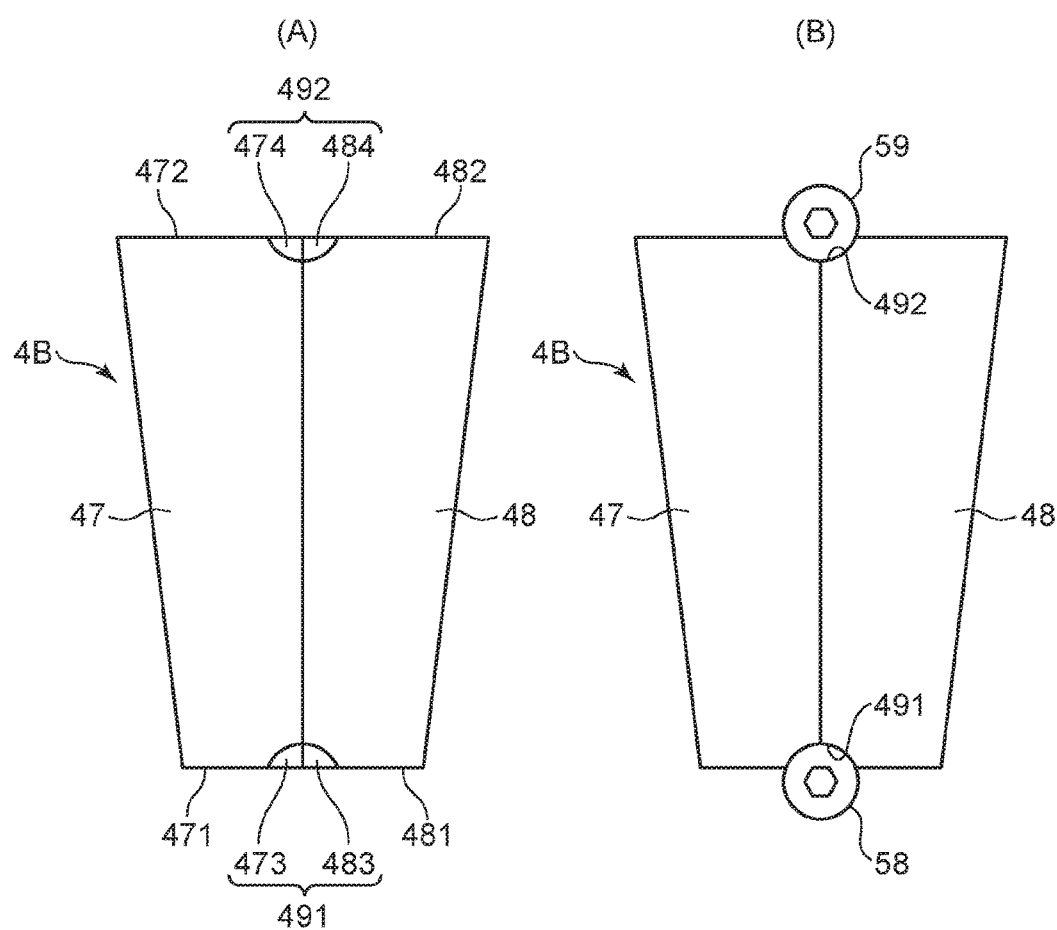
FIG. 13 shows plan views illustrating a modification of the second embodiment.

FIGS. 13(A) and 13(B) are plan views illustrating a state in which a permanent magnet 4B is attached to the substrate 31A according to a modification of the second embodiment. In the embodiment described above, magnetic pieces that are divided in the circumferential direction are fixed by using the first and second fixing screws 56 and 57 and the first and second fixing blocks 71 and 72 as fixing members. Fixing members described in the first embodiment can be also used for magnetic pieces divided in the circumferential direction.

FIG. 13(A) illustrates an example in which the permanent magnet 4B of one magnetic pole unit is composed of a fourth magnetic piece 47 and a fifth magnetic piece 48, which are divided into two in the circumferential direction. The fourth magnetic piece 47 has an inner recess 473, which is an engaged portion, at an inner end portion 471 in the radial direction, and an outer recess 474, which is an engaged portion, at an outer end portion 472 in the radial direction. The fifth magnetic piece 48 also has an inner recess 483 at an inner end portion 481 in the radial direction, and an outer recess 484 at an outer end portion 482 in the radial direction.

The inner recesses 473 and 483 are each an arc-shaped recess having a center angle of about 90 degrees. One inner semicircular recess 491 is formed by arranging the inner recesses 473 and 483 adjacent to each other. Likewise, one outer semicircular recess 492 is formed by arranging the outer recesses 474 and 484 adjacent to each other. As illustrated in FIG. 13(B), the permanent magnet 4B is fixed to the substrate 31A because the inner semicircular recess 491 is engaged with the countersunk-head screw 58 and the outer semicircular recess 492 is engaged with countersunk-head screw 59. With the modification, use of a component such as a fixing block can be omitted.

In addition, in the embodiment described above, the permanent magnet 4A of one magnetic pole unit P is divided into the plurality of magnetic pieces 44 to 46 in the circumferential direction. Instead, without dividing the permanent magnet 4A, the permanent magnet 4A may be fixed to the substrate 31A by using the first and second fixing screws 56 and 57 and the first and second fixing blocks 71 and 72. The inclined surfaces 441 and 442 of the magnetic piece and the reversely inclined surfaces 711 and 712 of the fixing block may be any appropriate surfaces that can surface-contact each other, and may have, for example, curved shapes or stepped shapes.

Third Embodiment

Figure 14:
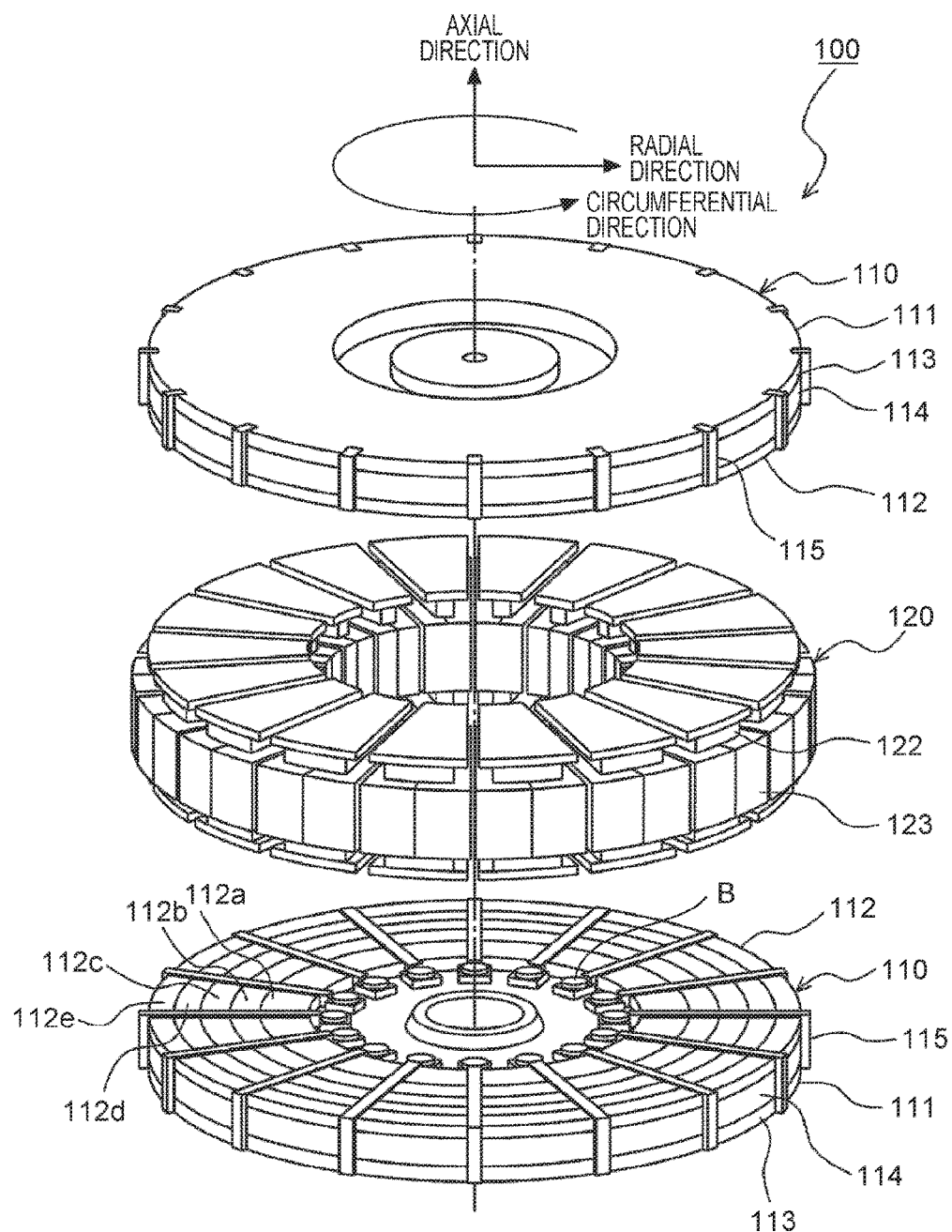
FIG. 14 is an exploded perspective view illustrating a stator and rotors according to a third embodiment of the present invention.

FIG. 14 is a perspective view illustrating the structure of an axial-gap rotating electric machine 100 according to a third embodiment. As with the first and second embodiments, the axial-gap rotating electric machine 100 is an axial-gap rotating electric machine having a single-stator double-rotor structure including two rotors 110 and one stator 120 and in which the rotors 110 are disposed on both sides of the stator 120. The rotors 110 are supported so as to be rotatable around a rotation shaft. Each of the rotors 110 faces the stator 120 with a gap therebetween in a direction in which the rotation shaft extends. In the following description, the direction in which the axis of the rotation shaft extends will be referred to as the "axial direction", the circumferential direction of a circle centered around the rotation shaft will be referred to as the "circumferential direction", and the radial direction of the circle will be referred to as the "the radial direction".

The rotor 110 includes a disk-shaped substrate 111 and permanent magnets 112. The substrate 111 includes a disk-shaped base member 113 whose central portion protrudes in a circular shape and a back yoke 114 having an annular plate-like shape. The base member 113 is made of a metal material that is not attracted by the permanent magnet 112, such as a stainless steel, copper, or aluminum; or a non-metal material, such as carbon fiber, a composite material, or the like. In consideration of strength, the material of the base member 113 is preferably a metal material having high rigidity. More preferably, the material is a stainless steel, in consideration of cost and workability.

The back yoke 114 is an iron core formed by winding a strip-shaped electromagnetic steel sheet that is made of a soft magnetic material. The back yoke 114 has a hollow portion near the center in the radial direction. On a surface of the base member 113 on the stator 120 side, the hollow portion of the back yoke 114 is fitted onto a protruding portion of the base member 113.

Figure 15:
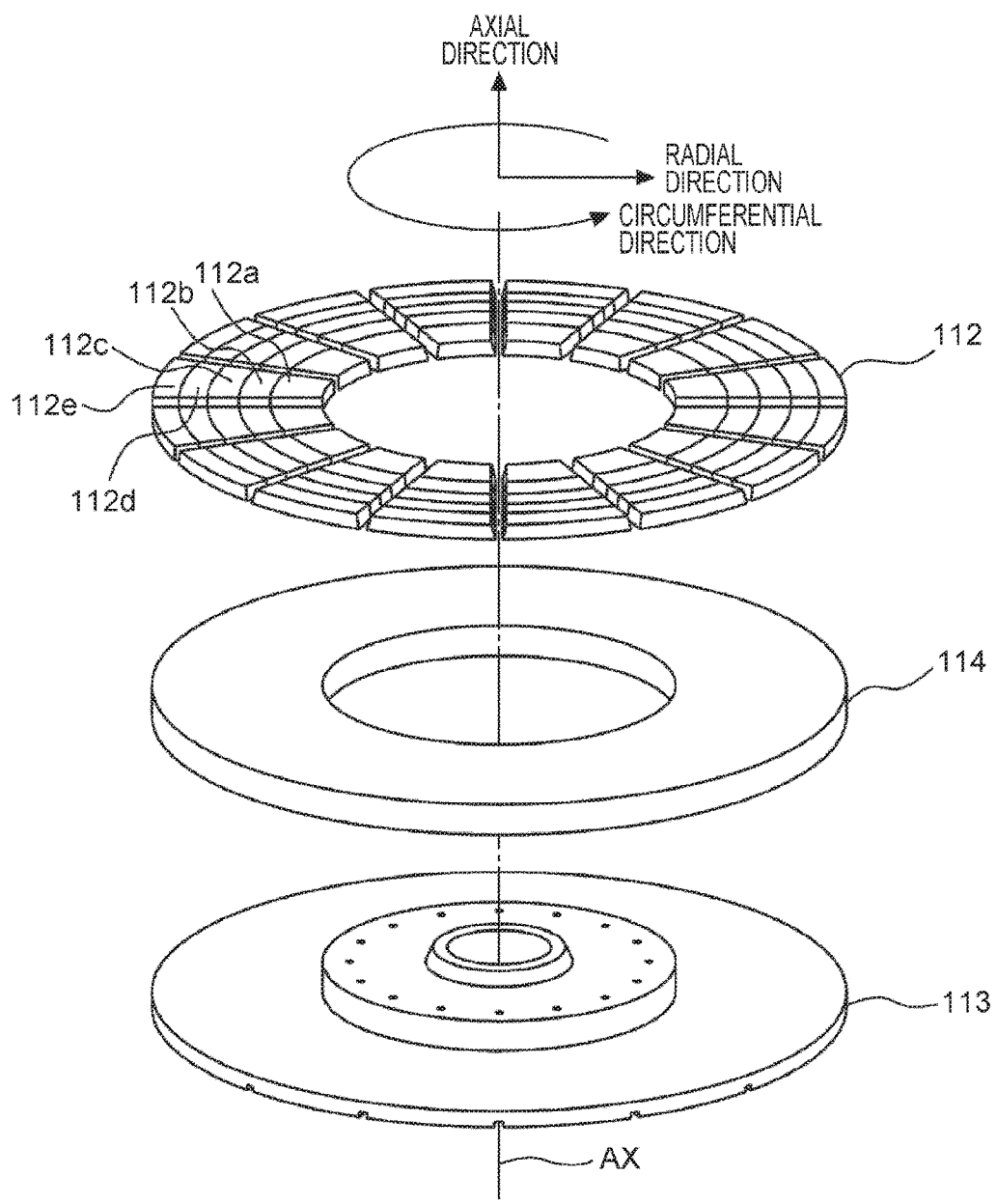
FIG. 15 is an exploded perspective view illustrating the structure of the rotor of the third embodiment.
Figure 16:
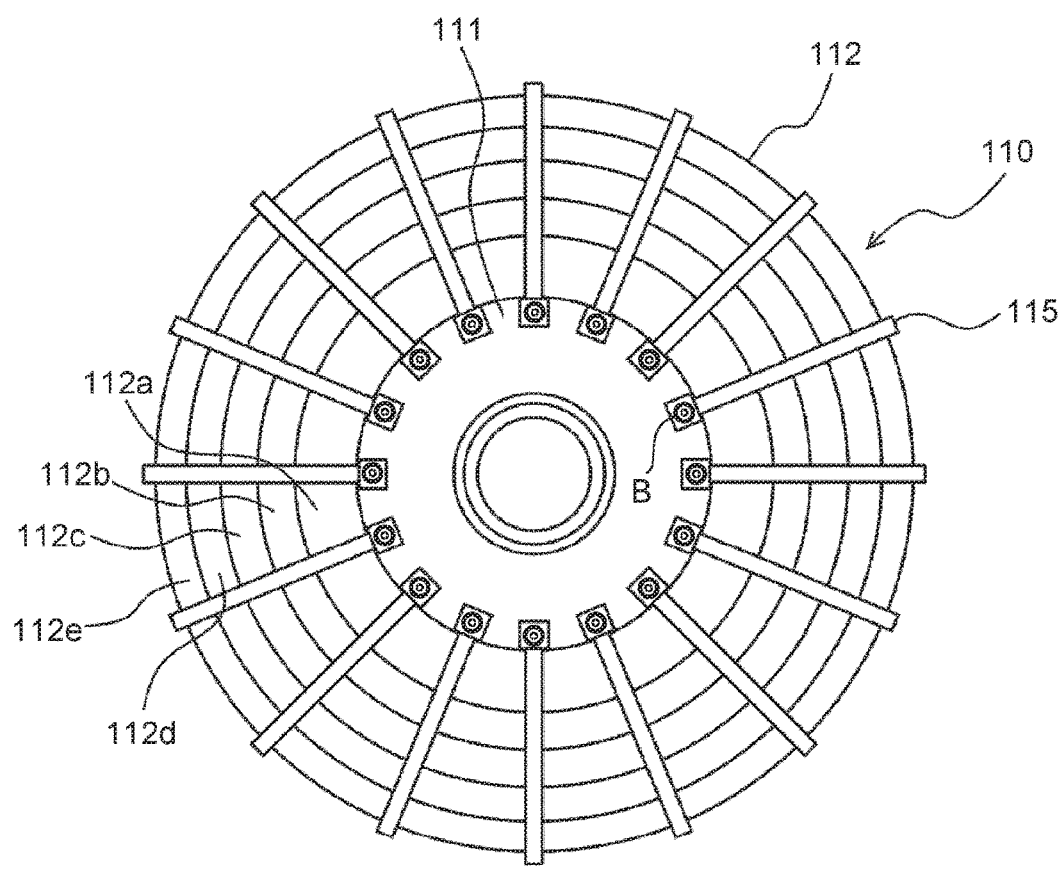
FIG. 16 is a front view of the rotor of the third embodiment.

FIG. 15 is an exploded perspective view illustrating the structure of the rotor 110. FIG. 16 is a front view of the rotor 110. On a surface of the back yoke 114 facing the stator 120, the plurality of permanent magnets 112 (corresponding to the magnetic pole units P of the first and second embodiments) are arranged at regular intervals in the circumferential direction around the rotation axis AX. Each of the permanent magnets 112 has a sectoral shape whose central portion is cut off in an arc shape in a front view and has a plate-like shape having a uniform thickness (length in the axial direction). The permanent magnets 112 are disposed in such a way that the centers of the sectoral shapes coincide with the rotation axis AX. The number of the permanent magnets 112 is 16. These permanent magnets 112 are fixed to the substrate 111 by using fixing members 115. A method of fixing the permanent magnets 112 will be described below.

Figure 17:
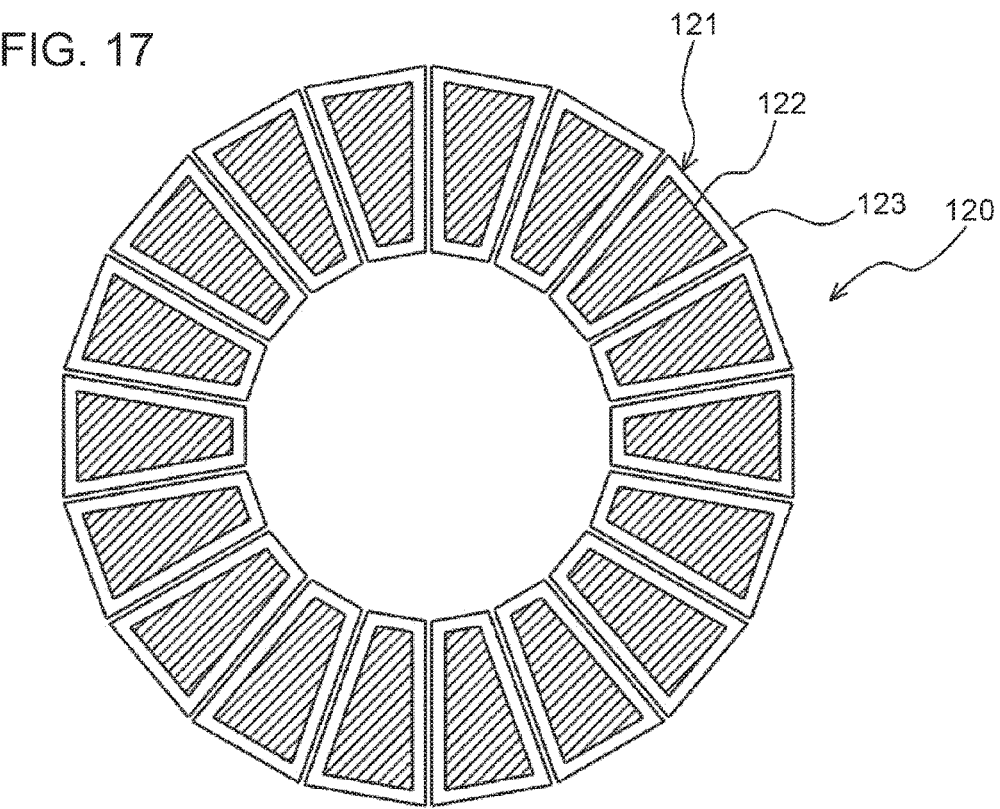
FIG. 17 is a front view illustrating the structure of the stator of the third embodiment.

Next, the structure of the stator 120 will be described. FIG. 17 is a front view illustrating the structure of the stator 120. The stator 120 includes magnetic cores 122 and excitation coils 123.

Each of the magnetic cores 122 is formed by stacking a plurality of electromagnetic steel sheets, which are soft magnetic materials, in the radial direction. The plurality of the magnetic cores 122 are arranged at regular intervals in the circumferential direction around the rotation axis AX. Each of the magnetic cores 122 has a block-like shape that is trapezoidal in a front view, and is disposed in such a way that the short base of the trapezoid is on the rotation shaft side and the long base of the trapezoid is on the outer peripheral side. The number of the magnetic cores 122 (stator number) is 18. The stator number may be different from 18. Note that, when driving the axial-gap rotating electric machine 100 by using a three-phase electric current, the stator number needs to be a multiple of 3. The number of the permanent magnets 112 (pole number) need not be 16 when the stator number is 18. Another combination may be used. However, the pole number needs to be an even number. For example, the pole number may be 14 or 12 when the stator number is 18. However, depending on the combination of the stator number and the pole number, the efficiency of the axial-gap rotating electric machine 100 may decrease. Preferably, the pole number is 16 when the stator number is 18. The magnetic cores 122 are held by a bobbin (not shown) made of an insulating material.

The excitation coil 123 is formed by winding a conductive wire around the magnetic core 122. The magnetic core 122 and the excitation coil 123 constitute an electromagnet 121. When an electric current flows through the excitation coil 123, magnetic field is generated so that a side of the electromagnet 121 facing the rotor 110 becomes the north pole or the south pole. The electromagnet 121 is energized so that a magnetic pole opposite to an adjacent electromagnet 121 is generated. That is, electric currents in opposite directions are supplied to adjacent excitation coils 123, and adjacent magnetic cores 122 are excited to be opposite magnetic poles.

Next, a method of fixing the permanent magnets 112 to the substrate 111 will be described. As illustrated in FIG. 16, each of the fixing members 115 is disposed between a corresponding pair of adjacent permanent magnets 112, and the fixing members 115 fix the permanent magnets 112 to the substrate 111 so as to press the permanent magnets 112 against the substrate 111.

Figure 18:
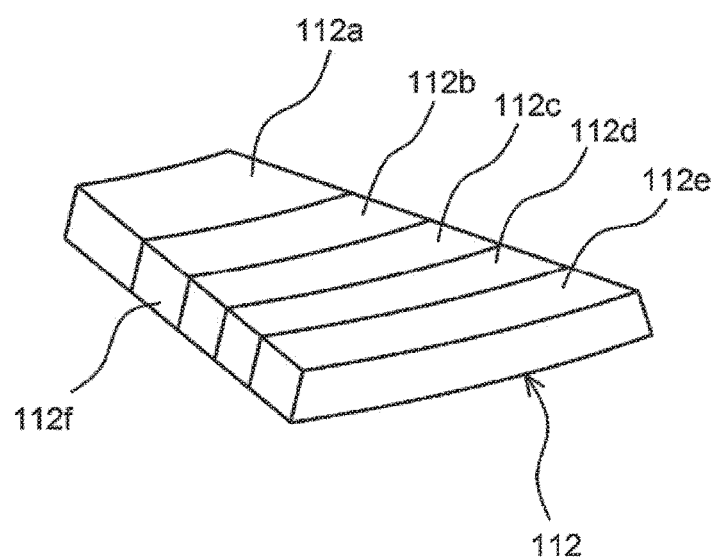
FIG. 18 is a perspective view illustrating the structure of a permanent magnet in the third embodiment.

FIG. 18 is a perspective view illustrating the structure of one of the permanent magnets 112. The permanent magnet 112 is composed of a plurality of magnetic elements 112*a* to 112*e*, each of which is curved in an arc shape and which are arranged in the radial direction. By dividing the permanent magnet 112 in this way, Joule loss can be reduced. The permanent magnet 112 has first inclined surfaces 112*f* at both edges thereof in the circumferential direction. The first inclined surface 112*f* faces toward the stator 120. Because the pair of first inclined surfaces 112*f* are formed, the permanent magnet 112 has a tapered shape such that the width thereof in the circumferential direction gradually decreases toward the stator 120. That is, the cross-sectional shape of the permanent magnet 112, when cut in the width direction, is a low-profile trapezoid.

Figure 19:
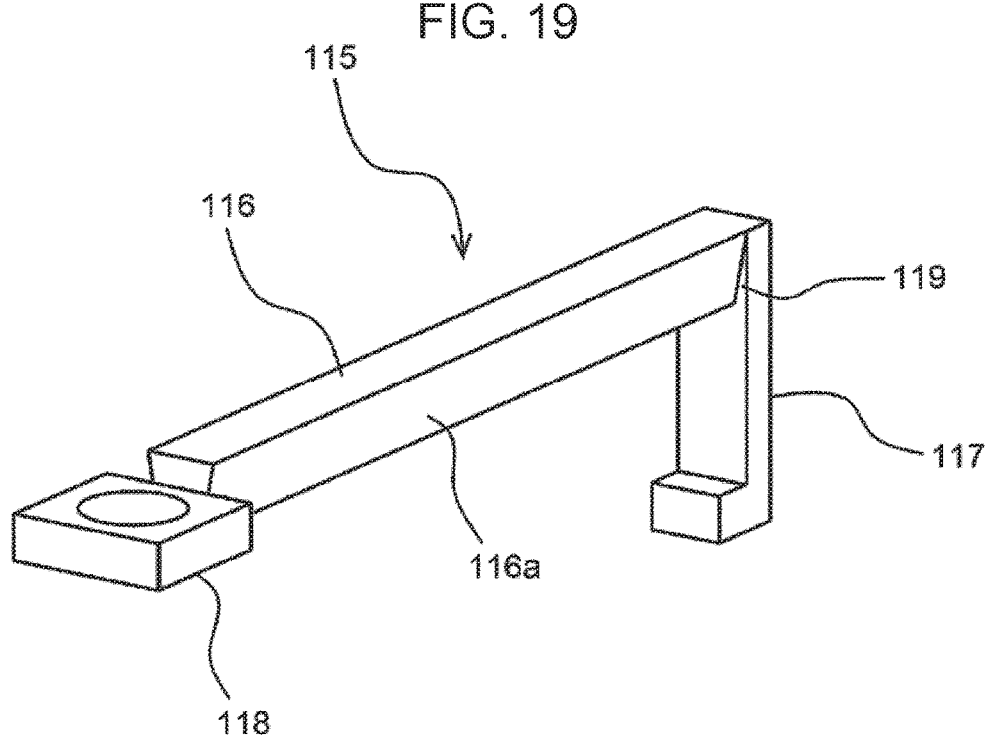
FIG. 19 is a perspective view illustrating the structure of a fixing member in the third embodiment.

Referring to FIG. 19, the fixing member will be described. FIG. 19 is a perspective view illustrating the structure of one of the fixing members 115. The fixing member 115 is made of a nonmagnetic material. Examples of the nonmagnetic material include a synthetic resin, carbon fiber, glass fiber, a composite material composed of glass fiber and a synthetic resin matrix, austenitic stainless steel, copper, and aluminum. Here, the term "nonmagnetic" refers to a property of not being substantially magnetizable, including a case of being slightly magnetizable so as not to be magnetically attached to a permanent magnet. Thus, magnetic flux generated by the permanent magnet 112 is prevented from passing through the fixing member 115 and extending in the circumferential direction. Therefore, magnetic flux concentrates on the front side and the rear side of the permanent magnet 112, and the efficiency of the motor is increased. Moreover, an assembly operation is facilitated, because the fixing member 115 is not attracted or repelled by the magnetic force of the permanent magnet 112.

The fixing member 115 includes a bar-shaped portion 116 extending in the radial direction, an engaging portion 117 extending in the axial direction from one end of the bar-shaped portion 116, and a fixing portion 118 disposed at the other end of the bar-shaped portion 116. The bar-shaped portion 116 includes second inclined surfaces 116a at both side edges thereof in the circumferential direction. That is, the cross-sectional shape of the bar-shaped portion 116, when cut in the width direction, is an inverted trapezoid.

The engaging portion 117 is a bar-shaped portion that extends toward the substrate 111 from an outer end of the bar-shaped portion 116 in the radial direction. An end portion of the engaging portion 117 on the substrate 111 side is bent inward in the radial direction, and the engaging portion 117 is L-shaped in a side view (as viewed in the circumferential direction). The width of the engaging portion 117 is the same as a wider part of the bar-shaped portion 116, that is, the length of the upper base of the inverted trapezoid. Thus, the width of the engaging portion 117 is larger than the width of a narrower part of the bar-shaped portion, that is, the length of the lower base of the inverted trapezoid. Therefore, at a connection portion between the bar-shaped portion 116 and the engaging portion 117, a triangular region is formed in an inner part of the engaging portion 117 in the radial direction. The triangular region is a restricting portion 119 that restricts movement of the permanent magnet 112 outward in the radial direction.

Figure 20:
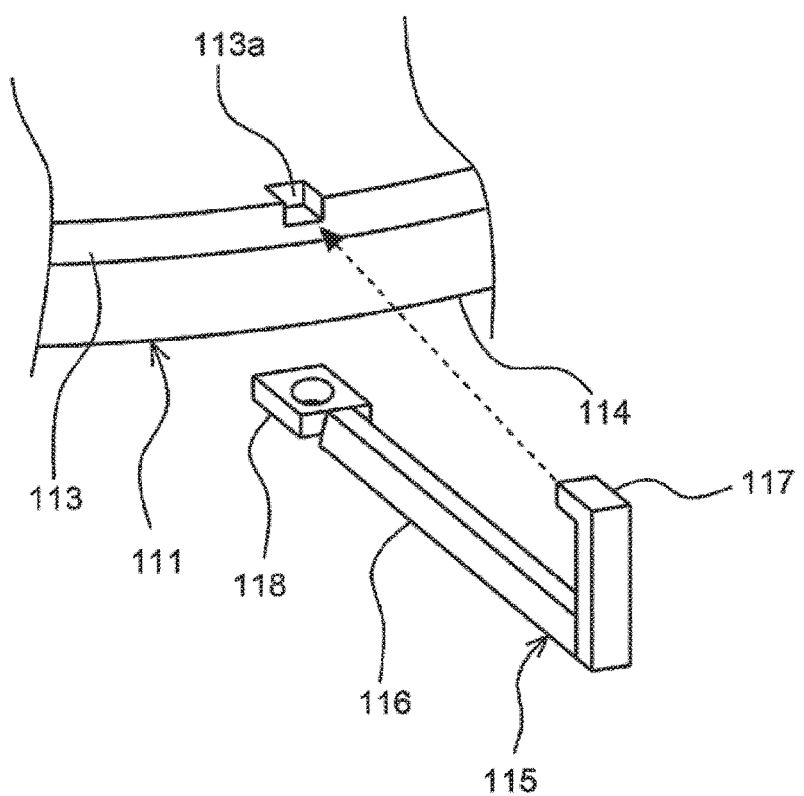
FIG. 20 is a perspective view illustrating a method of engaging the fixing member with a substrate.

The engaging portion 117 is disposed outside of the permanent magnet 112 in the radial direction and engages with the substrate 111. FIG. 20 is a perspective view illustrating a method of attaching the engaging portion 117 to the substrate 111. Recesses 113a are disposed at regular intervals in the circumferential direction in the outer periphery of the rear side of the base member 113. The engaging portion 117 is attached to a corresponding one of the recesses 113a in such a way that the bent portion engages with the recess 113a.

As illustrated in FIGS. 14 to 16, the fixing portion 118 is fixed to the circular protruding portion of the base member 113, that is, a portion of the base member 113 inside of the permanent magnet 112 in the radial direction, by using a bolt B. Thus, the fixing member 115 is attached to the substrate 111 at two positions respectively inside and outside of the permanent magnet 112 in the radial direction by using the engaging portion 117 and the fixing portion 118. Accordingly, the fixing member 115 can be fixed to the substrate 111 at a small number of attachment positions. By engaging the fixing member 115 with the substrate 111 at one of the two attachment positions and by fixing the fixing member 115 to the substrate 111 at the other attachment position, the number of fasteners, such as bolts, can be reduced to the minimum.

Figure 21:
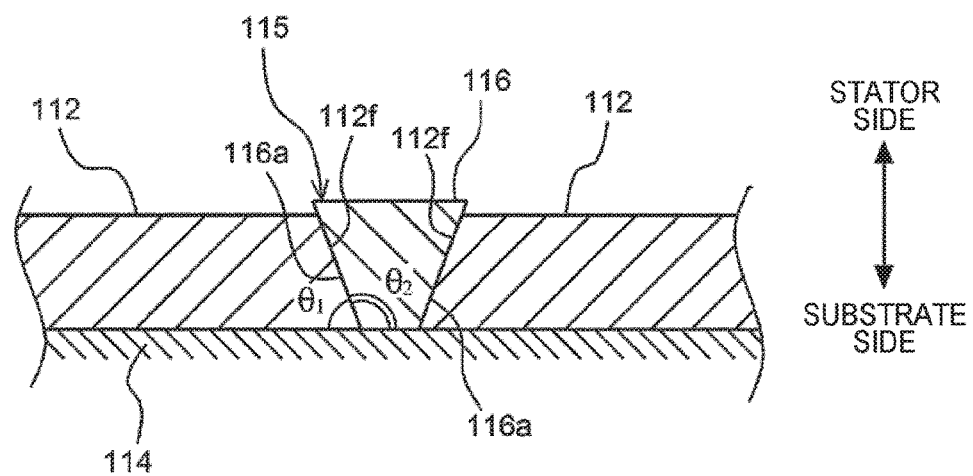
FIG. 21 is a sectional view illustrating a state in which the permanent magnet is fixed to the substrate by using the fixing member.

The fixing member 115 is attached to the substrate 111 in such a way that the bar-shaped portion 116 extends along the entire length of the permanent magnet 112 in the radial direction. FIG. 21 is a sectional view illustrating a state in which the permanent magnets 112 are fixed to the substrate 111 by using the fixing member 115. When fixing two permanent magnets 112 by using the fixing member 115, the bar-shaped portion 116 closely contacts end portions of the permanent magnets 112 that are close to each other. Here, the sum of the inclination angle θ1 of the first inclined surface 112f and the inclination angle θ2 of the second inclined surface 116a is 180°, and the first inclined surface 112f and the second inclined surface 116a surface-contact each other. Because the width of a part of the bar-shaped portion 116 on the stator 120 side is larger than the width of a part of the bar-shaped portion 116 on the substrate 111 side, the bar-shaped portion 116 covers end portions (the first inclined surfaces 112f) of the permanent magnets 112 in the circumferential direction. Thus, the permanent magnets 112 are prevented from dropping toward the stator 120. Moreover, by covering the first inclined surfaces 112f of the permanent magnets 112 with the second inclined surfaces 116a of the fixing member 115, the height of (length in the axial direction) of the fixing member 115 can be reduced.

By fixing the fixing member 115 to the substrate 111 by using the bolt B, the permanent magnet 112 can be fixed to the substrate 111 so as to be pressed against the substrate 111. Because the second inclined surface 116a is pressed against the first inclined surface 112f, the permanent magnet 112 is pressed not only toward the substrate 111 but also in the circumferential direction, and the permanent magnet 112 can be fixed also in the circumferential direction. Moreover, because the bar shaped portion 116 extends along the entire length of the permanent magnet 112 in the radial direction, all of the magnetic elements 112a to 112e of one permanent magnet 112 are pressed against the substrate 111 by the bar-shaped portion 116, and the magnetic elements 112a to 112e are prevented from becoming separated from each other.

The restricting portion 119 (see FIG. 19) of the fixing member 115 is disposed so as to face an outer side surface, in the radial direction, of an end portion of the permanent magnet 112 in the circumferential direction. When the rotor 110 rotates, a centrifugal force directed outward in the radial direction acts on the permanent magnet 112. However, the restricting portion 119 restricts movement of the permanent magnet 112 outward in the radial direction and prevents dropping of the permanent magnet 112.

By fixing the permanent magnet 112 to the substrate 111 by using the fixing member 115 described above, it is not necessary to use an adhesive. Moreover, because the permanent magnet 112 is mechanically fixed to the substrate 111 by using the fixing member 115, the force that fixes the permanent magnet 112 does not decrease due to heat generated by an eddy current in the permanent magnet 112 and the substrate 111. An adhesive may be used in order to assist fixing by the permanent magnet 112.

Figure 22:
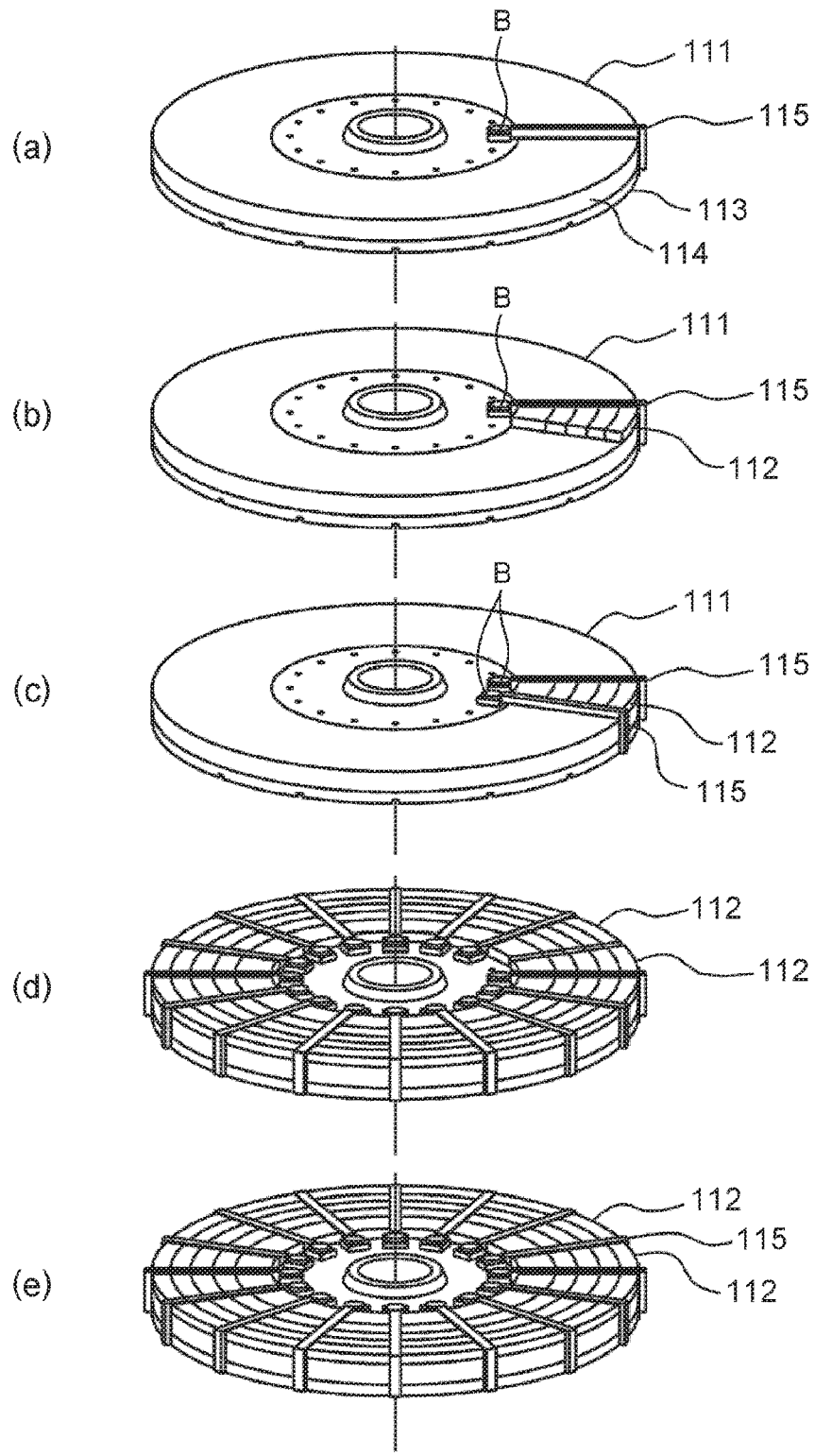
FIG. 22 shows perspective views illustrating a process of attaching the permanent magnet to the substrate.

FIG. 22 shows perspective views illustrating a process of attaching the permanent magnet 112 to the substrate 111. First, the back yoke 114 is attached to the base member 113, one fixing member 115 is attached to the substrate 111, and the fixing member 115 is fixed by using the bolt B (a). Next, by arranging the plurality of magnetic elements 112a to 112e along the bar-shaped portion 116 of the fixing member 115, which has been fixed to the substrate 111, one permanent magnet 112 is placed on the front surface of the back yoke 114 (b). At this time, the first inclined surface 112f of the permanent magnet 112 is made to closely contact one of the second inclined surfaces 116a of the bar-shaped portion 116.

Next, another fixing member 115 is attached to the substrate 111 in such a way that the permanent magnet 112, which has been placed on the front surface of the substrate 111, is interposed between the other fixing member 115 and the fixing member 115 that has been attached previously, and the other fixing member 115 is fixed by using the bolt B (c). At this time, one of the second inclined surfaces 116a of the bar-shaped portion 116 is made to closely contact the first inclined surface 112f of the permanent magnet 112.

Likewise, the permanent magnets 112 and the fixing members 115 are successively attached to the substrate 111. After attaching the second last (15th) permanent magnet 112 to the substrate 111 and before attaching the last fixing member 115, the last (16th) permanent magnet 112 is attached to the substrate 111 (d). At this time, the last permanent magnet 112 is placed on the front surface of the substrate 111 in such a way that the last permanent magnet 112 closely contacts the fixing member 115 that has been first attached to the substrate 111 and a gap is formed between the last permanent magnet 112 and the second last permanent magnet 112.

The last fixing member 115 is attached so as to be fitted into the gap formed between the two permanent magnets 112. This fixing member 115 is fixed by using the bolt B, thereby completing the rotor 110 (*e*).

Modification of Third Embodiment

Figure 23:
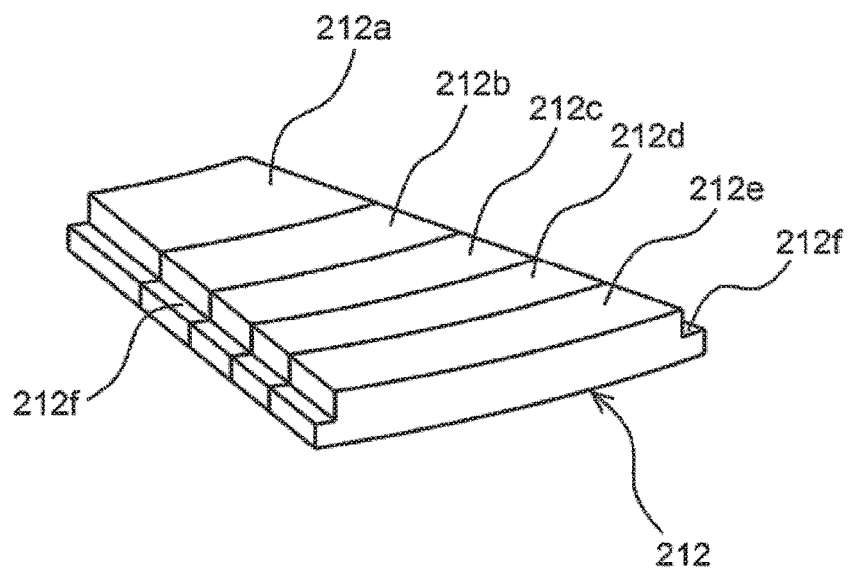
FIG. 23 is a perspective view illustrating the structure of a permanent magnet according to a modification of the third embodiment.

FIG. 23 is a perspective view illustrating the structure of a permanent magnet 212 according to a modification of the third embodiment. The permanent magnet 212 includes a plurality of magnetic elements 212*a* to 212*e*, each of which is curved in an arc shape and which are arranged in the radial direction. The permanent magnet 212 has first stepped portions 212*f* at both edges thereof in the circumferential direction. In the first stepped portion 212*f*, the width of a part on the stator 120 side from the center in the axial direction is small, and the width of a part on the substrate 111 side from the center is small. That is, at both ends of the permanent magnet 212 in the circumferential direction, portions on the substrate 111 side protrude.

Figure 24:
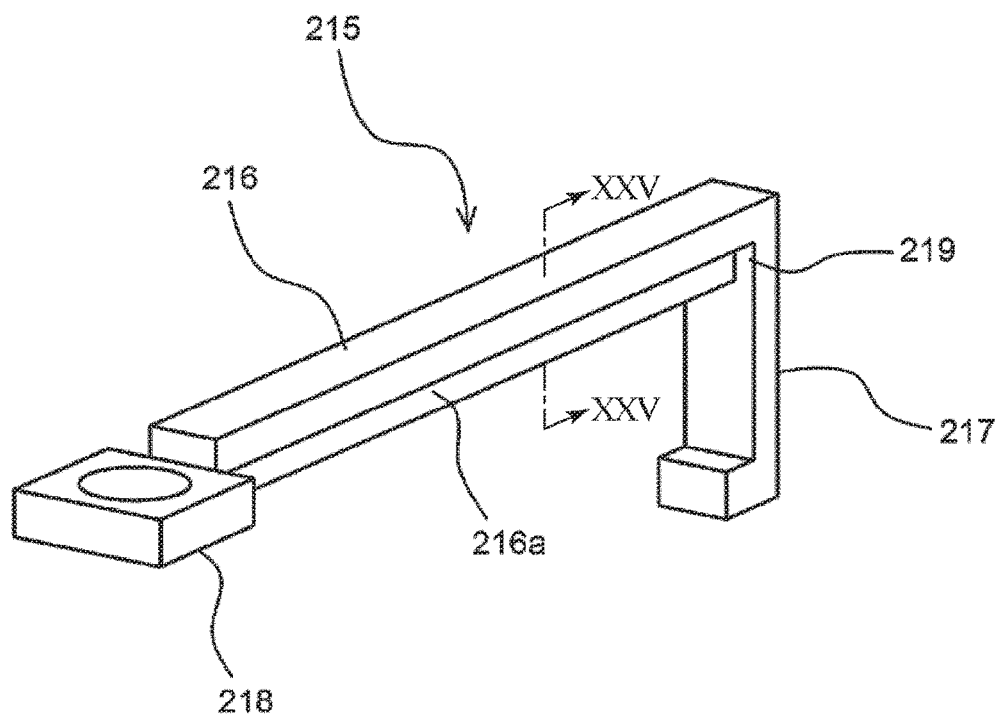
FIG. 24 is a perspective view illustrating the structure of a fixing member in the modification.
Figure 25:
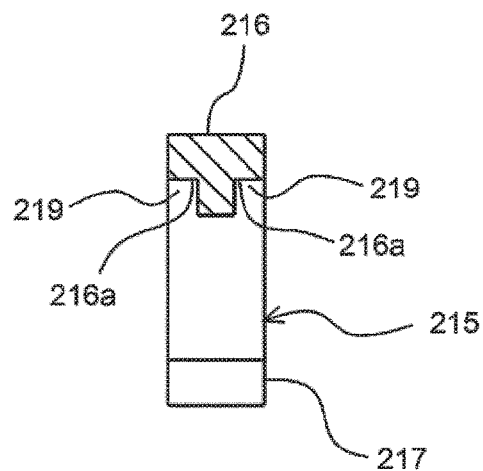
FIG. 25 is a sectional view taken along line XXV-XXV of FIG. 24.

FIG. 24 is a perspective view illustrating the structure of a fixing member 215 in the present modification. The fixing member 215 is made of a nonmagnetic material. The fixing member 215 includes a bar-shaped portion 216 extending in the radial direction, an engaging portion 217 extending in the axial direction from one end of the bar-shaped portion 216, and a fixing portion 218 disposed at the other end of the bar-shaped portion 216. FIG. 25 is a sectional view taken along line XXV-XXV of FIG. 24. The bar-shaped portion 216 includes second stepped portions 216*a* at both edges thereof in the circumferential direction. In the second stepped portion 216*a*, the width of a part on the stator side from the center in the axial direction is large, and the width of a part on the rotor substrate side from the center is small. Description of the engaging portion 217 and the fixing portion 218, which have the same structures as the engaging portion 117 and the fixing portion 118 of the third embodiment, will be omitted.

At a connection portion between the bar-shaped portion 216 and the engaging portion 217, a quadrangular region is formed in an inner part of the engaging portion 217 in the radial direction. The quadrangular region is a restricting portion 219 that restricts movement of the permanent magnet outward in the radial direction.

Figure 26:
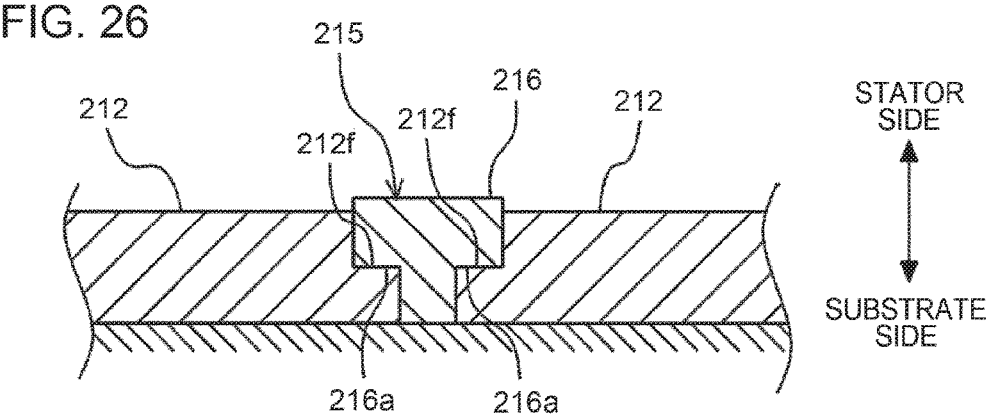
FIG. 26 is a sectional view illustrating a state in which permanent magnets according to the modification are fixed to a substrate by using the fixing member.

The fixing member 215 is attached to the substrate 111 in such a way that the bar-shaped portion 216 extends along the entire length of the permanent magnet 212 in the radial direction. FIG. 26 is a sectional view illustrating a state in which the permanent magnets 212 are fixed by using the fixing member 215. When fixing two permanent magnets 212 by using the fixing member 215, the bar-shaped portion 216 closely contacts end portions of the permanent magnets 212 that are close to each other. Here, the first stepped portions 212*f* and the second stepped portions 216*a* surface-contact each other so as to be fitted to each other. Because the width of a part of the bar-shaped portion 216 on the substrate 111 side is larger than the width of a part of the bar-shaped portion 216 on the stator 120 side, the bar-shaped portion 216 covers end portions (the first stepped portions 212*f*) of the permanent magnets 212 in the circumferential direction. Thus, each of the permanent magnets 212 is prevented from dropping toward the stator 120. Moreover, by covering the first stepped portions 212*f* of the permanent magnet 212 with the second stepped portions 216*a* of the fixing member 215, the height of (length in the axial direction) of the fixing member 215 can be reduced.

By fixing the permanent magnet 212 to the substrate 111 by using the fixing member 215, it is not necessary to use an adhesive. Moreover, because the permanent magnet 212 is mechanically fixed to the substrate 111 by using the fixing member 215, the force that fixes the permanent magnet 212 does not decrease due to heat generated by an eddy current in the permanent magnet 212 and the substrate 111. An adhesive may be used in order to assist fixing by the permanent magnet 212.

In the third embodiment and the modification thereof, a structure in which a fixing member is disposed between adjacent two permanent magnets is described. However, this is not a limitation. For example, a fixing member may be disposed at the center of a permanent magnet in the circumferential direction so as to extend along the entire length of the permanent magnet in the radial direction.

Figure 27:
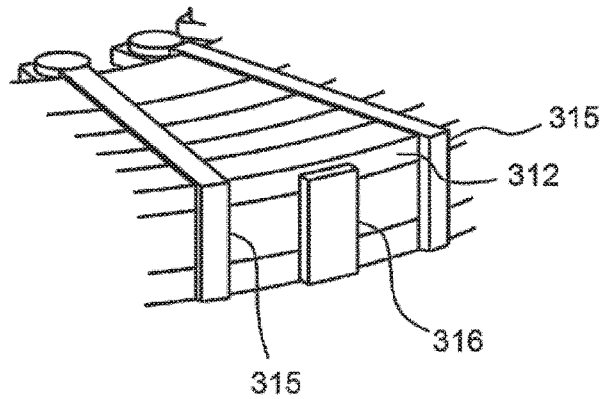
FIG. 27 is perspective view illustrating a modification of a restricting portion.

In the third embodiment and the modification thereof, the fixing member includes a restricting portion that restricts movement of the permanent magnet outward in the radial direction. However, this is not a limitation. FIG. 27 is a perspective view illustrating a modification of the restricting portion. In this example, a restricting portion 316 is provided in addition to a fixing member 315. The restricting portion 316 is disposed outside in the radial direction of the center of one permanent magnet 312 in the circumferential direction. The restricting portion 316 is fixed to the substrate 111 at a position facing the outer side surface of the permanent magnet 312 in the radial direction, and thereby restricts movement of the permanent magnet 312 outward in the radial direction. In this example, the fixing member 315 does not have a restricting portion.

In the third embodiment and the modification thereof, a structure in which one end of the fixing member is engaged with the substrate 111 and the other end of the fixing member is fixed to the substrate 111 is described. However, this is not a limitation. Both ends of the fixing member may be fixed to the substrate 111 by using bolts or the like. For example, in addition to both ends, one or several parts of the bar-shaped portion may be fixed to the substrate 111 by using bolts or the like.

The specific embodiments described above mainly include inventions having the following structures.

An axial-gap rotating electric machine according to an aspect of the present invention includes a stator including a magnetic core and an excitation coil; a rotor including a plurality of permanent magnets that are arranged in a circumferential direction around a rotation axis and a disk-shaped substrate that supports the permanent magnets, the rotor being disposed with a gap between the rotor and the stator in an axial direction; and a fixing member that fixes each of the permanent magnets to the substrate. Each of the permanent magnets includes a front surface facing the stator and a rear surface facing the substrate and includes an engaged portion in a peripheral portion thereof. The fixing member includes an engaging portion that engages with the engaged portion and a fixing portion that forms a mechanical fixing structure to the substrate. Preferably, the engaging portion is engaged with the engaged portion without protruding from the front surface of the permanent magnet.

With the rotating electric machine, the engaging portion of the fixing member restrains the permanent magnet by engaging with the engaged portion of the permanent magnet, while the engaging portion does not interfere with the stator because the engaging portion does not protrude from the front surface of the permanent magnet. Because the engaged portion is disposed in a peripheral portion of the permanent magnet, the engaged portion does not affect a magnetic circuit that the permanent magnet forms. Accordingly, even when the axial gap is very small, it is possible to appropriately fix the permanent magnet to the disk-shaped substrate without decreasing the magnetic performance.

In the rotating electric machine, the engaged portion may be a recess that is recessed from the front surface toward the rear surface of the permanent magnet, and the engaging portion may be contained in the recess.

With the rotating electric machine, the engaging portion engages with the permanent magnet in such a way that the engaging portion is contained in the recess. Accordingly, it is possible to realize fixing of the permanent magnet to the substrate with a simple structure.

In the rotating electric machine, the engaged portion may be an inclined surface that is formed at a periphery of the permanent magnet by making a width of the permanent magnet on the rear surface side larger than a width of the permanent magnet on the front surface side, and the engaging portion may have a thickness substantially equal to a thickness of the permanent magnet and may have a reversely inclined surface that surface-contacts the inclined surface.

With the rotating electric machine, it is possible to fix the permanent magnet to the substrate in a stable way such that the inclined surface, which is formed at a periphery of the permeant magnet, is pressed by the reversely inclined surface of the engaging portion.

In the axial-gap rotating electric machine, preferably, each of the plurality of permanent magnets is a permanent magnet that forms one magnetic pole, each of the permanent magnets is further divided into a plurality of magnetic pieces, and each of the magnetic pieces includes the engaged portion.

With the rotating electric machine, it is possible to reliably prevent removal of a magnetic piece from the substrate by using the engaging portion and the engaged portion according to the present invention while suppressing an eddy current generated in the permanent magnet that forms one pole.

In the rotating electric machine, preferably, the magnetic pieces are pieces into which the permanent magnet is divided in a radial direction of the disk-shaped substrate, and the engaged portion is disposed at each of two end portions of each of the magnetic pieces in a circumferential direction of the substrate.

With the rotating electric machine, each of the magnetic pieces, which are divided in the radial direction, is restrained by the engaging portion disposed at each of two ends thereof in the circumferential direction. Accordingly, it is possible to securely fix the magnetic piece to the substrate without decreasing a magnetic force generated by the magnetic piece.

In the rotating electric machine, preferably, the magnetic pieces are pieces into which the permanent magnet is divided in a circumferential direction of the disk-shaped substrate, and the engaged portion is disposed at each of two end portions of each of the magnetic pieces in a radial direction of the substrate.

With the rotating electric machine, each of the magnetic pieces, which are divided in the circumferential direction, is restrained by the engaging portion disposed at each of two ends thereof in the radial direction. Accordingly, it is possible to securely fix the magnetic piece to the substrate without decreasing a magnetic force generated by the magnetic piece.

In the rotating electric machine, preferably, the engaged portion of one of the permanent magnets and the engaged portion of another of the permanent magnets that are adjacent to each other or the engaged portion of one of the magnetic pieces and the engaged portion of another of the magnetic pieces that are adjacent to each other are each engaged with an engaging portion of one of the fixing members.

With the rotating electric machine, a plurality of permanent magnets or a plurality of magnetic pieces can be fixed by using one fixing member. Accordingly, the number of components can be reduced and the space for disposing the fixing member can be reduced.

In a case where a recess is used as the engaged portion and magnetic pieces divided in the radial direction are used as the permanent magnet, preferably, the engaged portion is a semicircular recess that is formed in each of two end portions of each of the magnetic pieces in the circumferential direction, the fixing member includes a shank that is the fixing portion and that has a circular cross-sectional shape and a head portion that has a larger diameter than the shank, that is the engaging portion, and that has a circular cross-sectional shape, one of the magnetic pieces belonging to one pole and another of the magnetic pieces adjacent thereto and belonging to another pole are disposed so that one substantially circular recess is formed by the semicircular recess of the one of the magnetic pieces and the semicircular recess of the other of the magnetic pieces, and the adjacent two magnetic pieces are fixed in such a way that the head portion of the fixing member is contained in the substantially circular recess.

In a case where an inclined surface is used as an engaged portion and magnetic pieces divided in the circumferential direction are used as the permanent magnet, preferably, the engaged portion is the inclined surface that is formed at each of two end portions of each of the magnetic pieces in the radial direction, the fixing member includes a fixing jig that has the reversely inclined surface and that is the engaging portion and a fastener that fixes the fixing jig to the substrate and that is the fixing portion, one of the magnetic pieces and another of the magnetic pieces adjacent thereto are disposed so that one enlarged inclined surface is formed by connecting the inclined surface of the one of the magnetic pieces and the inclined surface of the other of the magnetic pieces, and the adjacent two magnetic pieces are fixed in such a way that the reversely inclined surface of the fixing member presses the one enlarged inclined surface.

With the axial-gap rotating electric machine 1 according to the present invention described above, it is possible to securely fix the permanent magnet to the disk-shaped substrate of the rotor. A magnetic circuit formed by the permanent magnet is not affected. Accordingly, it is possible to provide an axial-gap rotating electric machine in which removal of a permanent magnet from a substrate does not occur and has high magnetic performance.

The invention claimed is:
1. An axial-gap rotating electric machine comprising:
a stator including a magnetic core and an excitation coil;
a rotor including a plurality of permanent magnets that are arranged in a circumferential direction around a rotation axis and a disk-shaped substrate that supports the permanent magnets, the rotor being disposed with a gap between the rotor and the stator in an axial direction; and
a fixing member that fixes each of the permanent magnets to the substrate, wherein each of the permanent magnets includes a front surface facing the stator and a rear surface facing the substrate and includes an engaged portion in a peripheral portion thereof, and wherein the fixing member includes an engaging portion that engages with the engaged portion and a fixing portion that forms a mechanical fixing structure to the substrate.

2. The axial-gap rotating electric machine according to claim 1, wherein the engaging portion is engaged with the engaged portion without protruding from the front surface of the permanent magnet.

3. The axial-gap rotating electric machine according to claim 1, wherein the engaged portion is a recess that is recessed from the front surface toward the rear surface of the permanent magnet, and wherein the engaging portion is contained in the recess.

4. The axial-gap rotating electric machine according to claim 1, wherein the engaged portion is an inclined surface that is formed at a periphery of the permanent magnet by making a width of the permanent magnet on the rear surface side larger than a width of the permanent magnet on the front surface side, and wherein the engaging portion has a thickness substantially equal to a thickness of the permanent magnet and has a reversely inclined surface that surface-contacts the inclined surface.

5. The axial-gap rotating electric machine according to claim 1, wherein each of the plurality of permanent magnets is a permanent magnet that forms one magnetic pole, each of the permanent magnets is further divided into a plurality of magnetic pieces, and each of the magnetic pieces includes the engaged portion.

6. The axial-gap rotating electric machine according to claim 5, wherein the fixing member is disposed so as to extend across the plurality of magnetic pieces.

7. The axial-gap rotating electric machine according to claim 5, wherein the magnetic pieces are pieces into which the permanent magnet is divided in a radial direction of the disk-shaped substrate, and wherein the engaged portion is disposed at each of two end portions of each of the magnetic pieces in a circumferential direction of the substrate.

8. The axial-gap rotating electric machine according to claim 5, wherein the magnetic pieces are pieces into which the permanent magnet is divided in a circumferential direction of the disk-shaped substrate, and wherein the engaged portion is disposed at each of two end portions of each of the magnetic pieces in a radial direction of the substrate.

9. The axial-gap rotating electric machine according to claim 5, wherein the engaged portion of one of the permanent magnets and the engaged portion of another of the permanent magnets that are adjacent to each other or the engaged portion of one of the magnetic pieces and the engaged portion of another of the magnetic pieces that are adjacent to each other are each engaged with an engaging portion of one of the fixing members.

10. The axial-gap rotating electric machine according to claim 3, wherein each of the plurality of permanent magnets is a permanent magnet that forms one magnetic pole, each of the permanent magnets is further divided into a plurality of magnetic pieces, each of the magnetic pieces has the engaged portion, and the magnetic pieces are pieces into which the permanent magnet is divided in a radial direction of the disk-shaped substrate, wherein the engaged portion is a semicircular recess that is formed in each of two end portions of each of the magnetic pieces in the circumferential direction, wherein the fixing member includes a shank that is the fixing portion and that has a circular cross-sectional shape and a head portion that has a larger diameter than the shank, that is the engaging portion, and that has a circular cross-sectional shape, wherein one of the magnetic pieces belonging to one pole and another of the magnetic pieces adjacent thereto and belonging to another pole are disposed so that one substantially circular recess is formed by the semicircular recess of the one of the magnetic pieces and the semicircular recess of the other of the magnetic pieces, and wherein the adjacent two magnetic pieces are fixed in such a way that the head portion of the fixing member is contained in the substantially circular recess.

11. The axial-gap rotating electric machine according to claim 4, wherein each of the plurality of permanent magnets is a permanent magnet that forms one magnetic pole, each of the permanent magnets is further divided into a plurality of magnetic pieces, each of the magnetic pieces includes the engaged portion, and the magnetic pieces are pieces into which the permanent magnet is divided in a circumferential direction of the disk-shaped substrate, wherein the engaged portion is the inclined surface that is formed at each of two end portions of each of the magnetic pieces in the radial direction, wherein the fixing member includes a fixing jig that has the reversely inclined surface and that is the engaging portion and a fastener that fixes the fixing jig to the substrate and that is the fixing portion, wherein one of the magnetic pieces and another of the magnetic pieces adjacent thereto are disposed so that one enlarged inclined surface is formed by connecting the inclined surface of the one of the magnetic pieces and the inclined surface of the other of the magnetic pieces, and wherein the adjacent two magnetic pieces are fixed in such a way that the reversely inclined surface of the fixing member presses the one enlarged inclined surface.

12. The axial-gap rotating electric machine according to claim 1, further comprising:

a restricting portion that is fixed to the substrate so as to face an outer end portion of each of the permanent magnets in a radial direction of the disk-shaped substrate and that restricts movement of the permanent magnet outward in the radial direction.

13. The axial-gap rotating electric machine according to claim 1, wherein the fixing member is attached to the substrate so as to fix each of the permanent magnets to the substrate by pressing the permanent magnet against the substrate.

14. The axial-gap rotating electric machine according to claim 13,
wherein the fixing member is disposed between two of the permanent magnets that are adjacent to each other and is attached to the substrate so as to fix end portions of the two permanent magnets by pressing the end portions against the substrate, the end portions being close to each other.

15. The axial-gap rotating electric machine according to claim 14,
wherein the fixing member is fixed to the substrate in a state in which the fixing member covers each of the end portions of the two permanent magnets, the end portions being close to each other.

16. The axial-gap rotating electric machine according to claim 15,
wherein each of the permanent magnets includes a first inclined surface facing toward the stator, and
wherein the fixing member includes a second inclined surface facing toward the substrate and is fixed to the substrate so that the second inclined surface surface-contacts the first inclined surface.

17. The axial-gap rotating electric machine according to claim 16,
wherein the fixing member includes a restricting portion that is disposed at a position facing an outer end portion of each of the permanent magnets in the radial direction of the disk-shaped substrate and that restricts movement of the permanent magnet outward in the radial direction.

18. The axial-gap rotating electric machine according to claim 13,
wherein the fixing member extends along an entire length of each of the permanent magnets in a radial direction of the disk-shaped substrate, and is attached to the substrate at two positions inside and outside of the permanent magnet in the radial direction.

19. The axial-gap rotating electric machine according to claim 18,
wherein the fixing member is engaged with the substrate at one of positions inside and outside of the permanent magnet in the radial direction, and is fixed to the substrate at the other position.

* * * * *